United States Patent [19]

Lautzenhiser

[11] Patent Number: 5,635,807
[45] Date of Patent: Jun. 3, 1997

[54] ELECTRONIC CONTROLS FOR LINEAR AND ROTARY ACTUATORS

[76] Inventor: John L. Lautzenhiser, 0694 SR 427, Hamilton, Ind. 46742

[21] Appl. No.: 340,678

[22] Filed: Nov. 16, 1994

[51] Int. Cl.$^6$ ..................................................... G06F 7/04
[52] U.S. Cl. .............................. 318/625; 318/68; 180/907
[58] Field of Search ................................ 318/625, 66–71, 318/587

[56] References Cited

U.S. PATENT DOCUMENTS

| | | | |
|---|---|---|---|
| 4,634,941 | 1/1987 | Klimo | 318/139 |
| 5,033,000 | 7/1991 | Littlejohn et al. | 364/424.05 |
| 5,353,042 | 10/1994 | Klapman et al. | 345/15 C |

Primary Examiner—Brian Sircus
Attorney, Agent, or Firm—Wendell E. Miller

[57] ABSTRACT

A system (200) provides control of speeds and positioning of linear or rotary actuators (14A, 14B, 342A, 342B), and the system (200) may be used to control both speeds and steering of a conveyance (10). A transducer sensitivity control apparatus (202) provides selective control of sensitivity of transducers (28A, 28B) in an X-Y controller (26). The X-Y controller (26) delivers voltages to a steering sensitivity control apparatus (156, 180) that decreases, differences as an inverse and nonlinear function, in the two voltages supplied by the X-Y controller (26), thereby reducing steering sensitivity of the conveyance (10), increasing controllability in turns by decreasing sensitivity of joystick (34) movement, and/or automatically slowing the conveyance (10) when making sharp turns. A limit switch apparatus (204) shuts down the system (200) when an excessive voltage is developed by one of the transducers (28A, 28B) and a signal limiting apparatus (226) adjustably limits speeds of the actuators (14A, 14B, 342A, 342B). When an eyeglass X-Y controller (58) is used to control the conveyance (10), the system (200) provides head-actuated control of speed and steering, selective adjustment of tilt-angle sensitivity of the mercury-wiped transducers (62), selective adjustment of steering sensitivity, automatic slow-down when making sharp turns, automatic stopping of the conveyance (10) when either one of the two transducers (62) of the eyeglass X-Y controller (58) is tilted to an excessive tilt angle, and adjustable maximum speed of the conveyance (10).

29 Claims, 9 Drawing Sheets

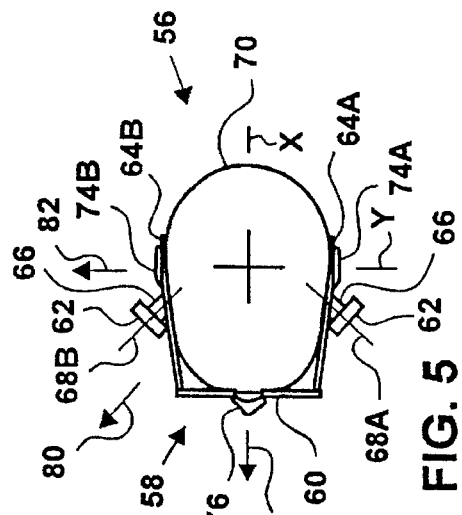
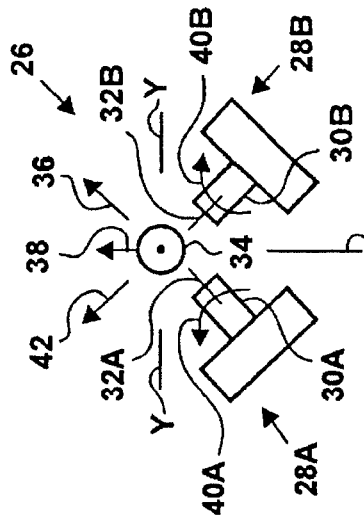
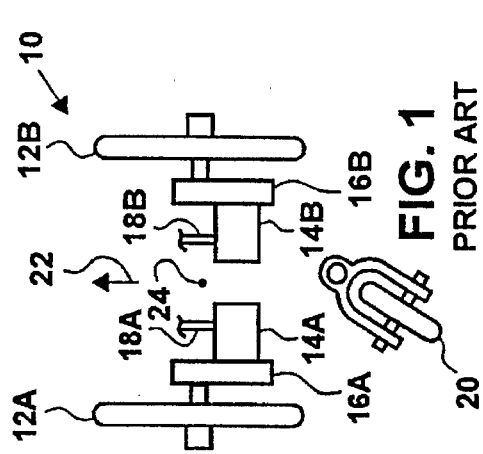
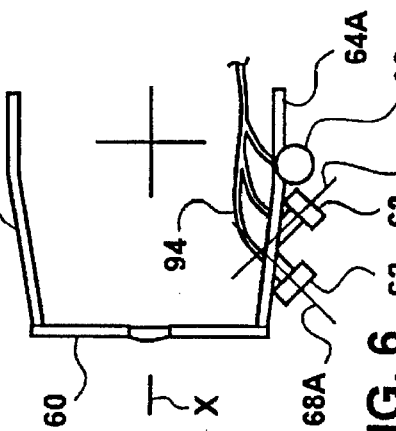
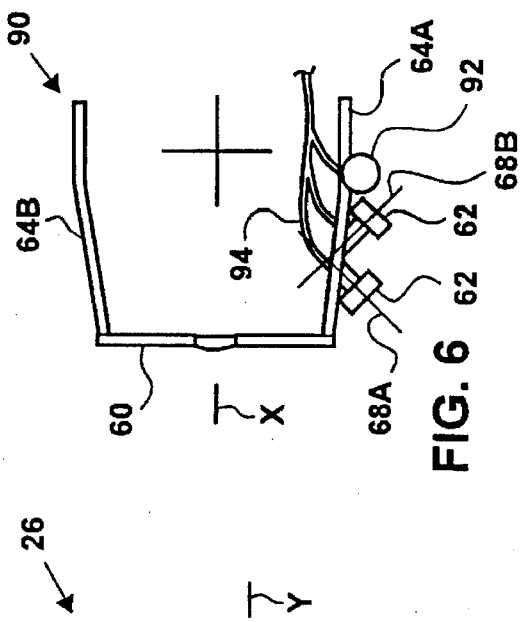
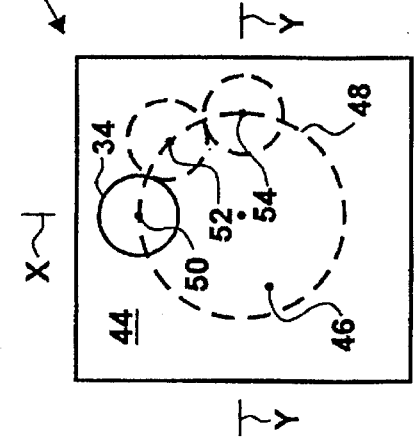

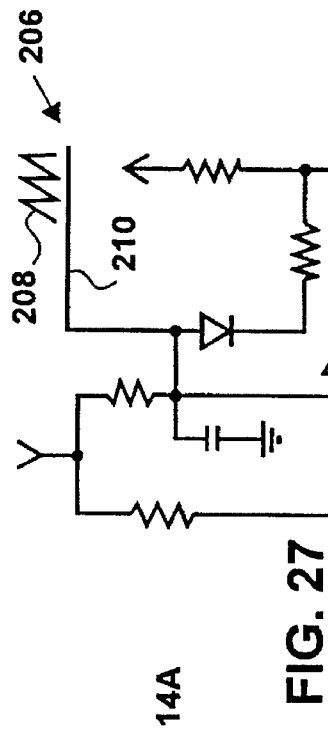
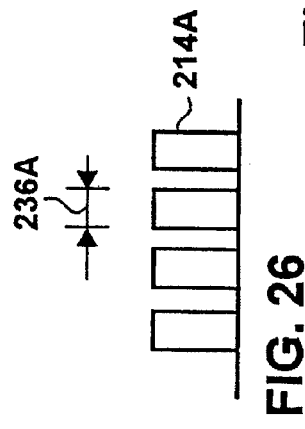
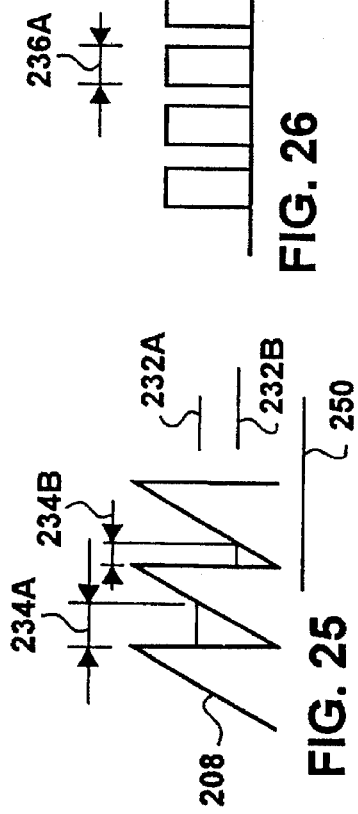
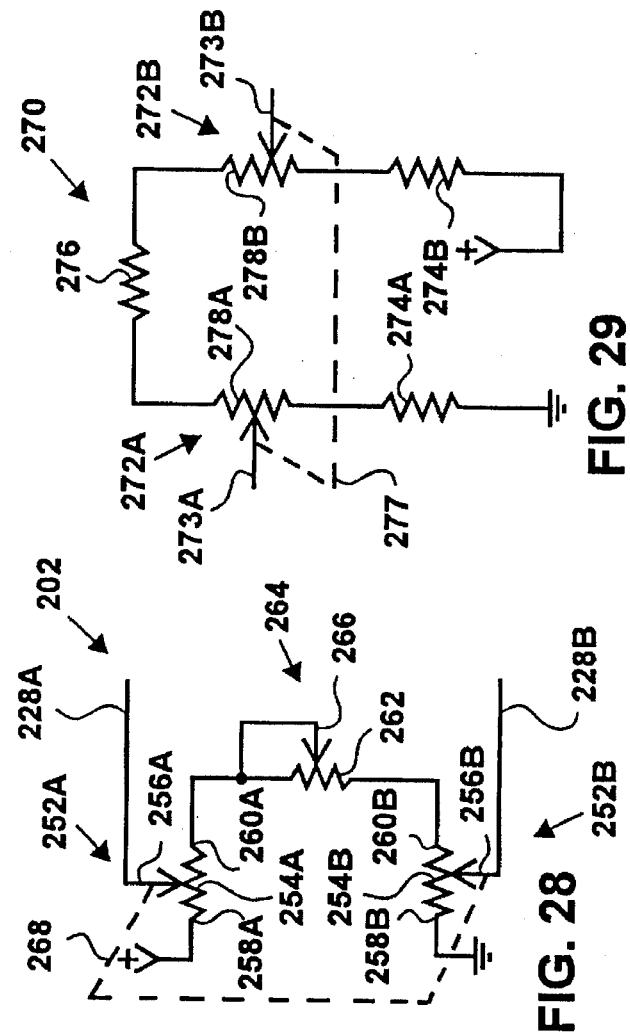
FIG. 27
FIG. 30
FIG. 26
FIG. 29
FIG. 25
FIG. 28

1

ELECTRONIC CONTROLS FOR LINEAR AND ROTARY ACTUATORS

BACKGROUND OF THE INVENTION

1. Field of the Invention

The present Invention relates generally to controls and electronic circuitry for use In controlling actuators. More particularly, the present invention relates to body-component actuated controls, such as head controls, that provide ease and precision of speed and positioning of linear or rotary actuators, and to apparatus, such as robotic devices and conveyances for handicapped persons that are controlled or powered by linear or rotary actuators.

2. Description of the Related Art

Control of linear and rotary actuators often includes the requirement that speeds and directions of movement of the actuators be precisely controlled. When steering of a vehicle is controlled by controlling speeds and direction of rotation of motors, and when linear actuators are used in robotics, it is important, not only to control the individual actuators, but also to control relative velocities of the actuators.

Conveyances, or electrically-propelled wheelchairs, provide mobility for a multitude of persons ranging in age from children less than three years old who will never walk, to adults who have been injured in accidents, and to elderly people who have acquired infirmities as they have aged. To these people, their freedom of mobility, and to a large extent their ability to be productive citizens in society, depends upon the mobility afforded by a power wheelchair. Included in this large group of people are some who lack either the use of limb or the motor skills to use the kinds of controls on conventional power wheelchairs.

Typically, power wheelchairs have been propelled by separate electric motors drivingly connected to left and right wheels of the wheelchair.

By controlling both voltage and polarity to the motors, control of forward and reverse speeds, speeds and steering have been controlled. This control of steering includes turns in which the wheelchair pivots around one wheel, and pivot turns in which the wheels rotate in opposite directions at the same speed.

The typical control is an X-Y controller in which a joystick is positioned with respect to X and Y axes to selectively adjust the resistances of two potentiometers or inductive transducers. For those with relatively good motor skills, this type of control has two weaknesses; and for others with poorer motor skills, this type of control is beyond use.

One of the weaknesses of this typical X-Y controller is that, when making a sharp turn in one direction, the controller increases the voltage and the speed of one electric motor up to 41 percent. Thus, at the time when good control dictates a reduced speed, a 41 percent increase in the speed of the motor on the outside of the turn results.

Another weakness is extreme steering sensitivity, making it difficult, even for those with good motor skills, to drive in a straight path and to make minor changes in direction.

These two weakness of X-Y controllers, which are inherent to the geometry of conventional X-Y controllers, In addition to making manual control of a joystick impossible for some handicapped persons, also makes it virtually impossible to provide suitable controls for actuation by other body components, such as controls actuated by inclinations of the human head.

Lautzenhiser, in U.S. Pat. No. 5,129,277, issued Jul. 14, 1992, provides an X-Y controller in which Y axis sensitivity is mechanically selectable, thereby overcoming some of the problems that accompany use of other prior art X-Y controllers. This X-Y controller, when used with the steering sensitivity control apparatus of the present invention, provides superior control of both steering and turning.

Lautzenhiser, in U.S. Pat. No. 5,012,165, issued Apr. 30, 1991, integrates signal variations caused by hand tremors, thereby providing an integrated, or averaged, output. While this prior art patent provides an important advance in the art, it does not achieve the advantages of the present invention.

In the present invention, instead of averaging or integrating the magnitudes of two control signals, differences in the two control signals are reduced as an inverse, nonlinear, and steady-state function of the differences in the two control signals.

That is, speeds and steering are controlled by successive inputs to the first and second transducers. As the first and second transducers are successively positioned to successively different positions, successive differences are produced between the two outputs. Therefore, "difference," as used herein, refers to a single difference in the two outputs that is produced by a single positioning of the transducers. In like manner, referring to "differences" reflects the fact that differences in the outputs are produced by successive positioning of the transducers.

Bell, in U.S. Pat. No. 4,667,136, issued 19 May 1987, teaches placing a resistor between the outputs of two potentiometers to reduce the differences between the two electrical signals and thereby to reduce steering sensitivity.

While Bell's use of a resistor does achieve a decrease steering sensitivity, it is important to notice that the decrease in differences between the electrical signals produced by the two potentiometers is linear. That is, a small difference in electrical signals produces a small decrease in the difference between the electrical signals, and larger differences result in proportionally larger decreases in the differences.

When differences between the electrical signals are small, such as when attempting to steer a straight path, a large percentage decrease in the differences in the electrical signals is needed to effectively reduce steering sensitivity, but Bell's resistor provides a relatively small, and therefore insufficient, reduction in the differences between the two electrical signals unless the resistance of Bell's resistor is relatively small.

However, when attempting to make a sharp turn or a pivot turn, and the differences between the electrical signals are large, a large decrease in the differences in the electrical signals decreases steering sensitivity so severely that it is impossible to effect sharp turns and pivot turns.

Therefore, the use of any fixed resistor having a resistance that adequately reduces sensitivity for steering a straight path, or adjustment of a variable resistor to a resistance that achieves useful reduction in sensitivity for steering a straight path, so severely reduces the difference between the two electrical signs, is, when differences between the signals are large, that it is impossible to make sharp turns or pivot turns.

SUMMARY OF THE INVENTION

The present invention provides body-actuated controls and circuitry for ease and precision in controlling linear or rotary actuators, whether the actuators are electrically, hydraulically, or pneumatically powered.

As described in detail herein, the present invention provides both steering sensitivity control apparatus and body-component actuated controls for controlling speed and steering of an electrically-propelled conveyance of the kind in which the speed is controlled by first and second electrical signals, and in which the steering is controlled by differences in the first and second electrical signals.

The steering sensitivity control apparatus includes first and second transducers, or potentiometers, that produce first and second electrical signals in response to first and second body-component movements.

Body-component actuation of the first and second transducers, as taught herein, includes hand actuation of a joystick with respect to X and Y axes, tilting of the human head or other body component with respect to X and Y axes, or actuation by movement of two separate body components, one representative of X axis movement and the other representative of Y axis movement.

The steering sensitivity control apparatus includes a three-terminal variable-conductance device, or transistor, which is preferably a FET, that decreases differences between the electrical signals produced by the transducers as a first function of the differences in electrical signal produced by the transducers.

The steering sensitivity control apparatus decreases differences between the first and second electrical signals by a smaller function of the differences in the signals as the differences in the signals increase.

One result is greatly enhanced ease of steering, the sensitivity of steering in a straight path being adjustably reduced as much as 90 percent. This ease of steering makes it possible for many with poor motor skills to successfully use a hand-actuated X-Y controller of the joystick type. Of equal or even greater significance, this ease of control makes head-actuated controls not only feasible, but also very practical.

A second result is that, instead of the wheel on the outside of a turn increasing in velocity when making turns with a wheelchair, which is an inherent function of the geometry of most X-Y controllers, in the present invention, the speed of the motor driving the wheel on the outside of the turn decreases in speed, thereby providing both enhanced controllability and safety when making turns.

Further, while decreasing the sensitivity in steering as much as 90 percent to achieve ease of steering control, by decreasing the differences in the electrical signals by a smaller percentage as the differences in the electrical signals increase, the steering sensitivity control apparatus of the present invention does not prevent making sharp turns or even pivot turns.

Not only does the present invention provide a nonlinear decrease in steering sensitivity, decreasing the differences in the two electrical signals by a smaller percentage as the differences increase, but also the present invention provides selectively adjustable control of this nonlinear decrease in steering sensitivity.

The present invention also provides adjustable speed limiting while allowing mechanical inputs to the X-Y controller, and electrical outputs from the X-Y controller to greatly exceed outputs that produce maximum allowable speeds of the motors.

The present invention further provides selectively adjustment of transducer sensitivity. When joystick actuated potentiometers are used for transducers, the transducer sensitivity control apparatus selectively adjusts volts change per angle of inclination of the joystick.

When tilt transducers, such as mercury-wiped transducers, are used with X-Y controllers, such as the eyeglass X-Y controller of the present invention, the transducer sensitivity control apparatus selectively adjusts volts change per degree of tilt angle of the transducers.

Finally, the apparatus of the present invention preferably includes circuity for bringing the conveyance to a stop if a body-component actuated transducer is actuated beyond its normal range. This provision stops the conveyance in instances in which the occupant/operator has a seizure, faints, or otherwise suffers a sudden physical, mental or emotional condition that not only prevents controlling the conveyance, but also results in a sudden maximum speed signal.

In a first aspect of the present invention, a method is provided for controlling speeds of first and second actuators as a function of first and second outputs produced by respective ones of first and second transducers and a difference between the outputs, and for controlling a difference in speed between the actuators as a function of the difference between the outputs, which method comprises user actuating the first transducer to selective input positions; user actuating the second transducer to selective input positions; producing the first output from the first transducer that is proportional to the selective positions thereof; producing the second output from the second transducer that is proportional to the selective positions thereof; reducing a difference between the outputs as an inverse and nonlinear function of the difference between the outputs; and controlling the actuators as a function of the reduced difference.

In a second aspect of the present invention, a method is provided for controlling both speed and steering of a conveyance, which method comprises controlling the speed as a function of first and second input positions of first and second transducers; controlling the steering as a function of a difference in the input positions; and decreasing sensitivity of the steering to the difference as an inverse and nonlinear function of the difference.

In a third aspect of the present invention, a method is provided for controlling both speed and steering of a conveyance, which method comprises controlling the speed as a function of first and second inputs to first and second transducers; controlling the steering as a function of a difference in the inputs; and automatically reducing the speed of the conveyance as a nonlinear function of the difference.

In a fourth aspect of the present invention, a method is provided for producing control signals, which method comprises producing first and second control signals proportional to successive ones of first and second inputs; decreasing differences in the control signals as an inverse and nonlinear function of the differences whenever the first control signal is greater than the second control signal; and decreasing differences in the control signals as an inverse and nonlinear function of the differences whenever the second control signal is greater than the first control signal.

In a fifth aspect of the present invention, a method is provided for producing control signals, which method comprises producing successive ones of first and second control signals proportional to successive inputs with respect to a first axis; decreasing differences between the control signals as an inverse and nonlinear function of the differences whenever one of the control signals is larger than the other of the control signals; and the decreasing step comprises analog processing of one of the control signals.

In a sixth aspect of the present invention, an X-Y controller is provided which comprises eyeglass frames having a pair of earpieces; means, including first and second transducers, each having a sensing axis, and both being mounted to the eyeglass frames, for producing first and second outputs that are proportional to inclinations of a head of a person wearing the eyeglass frames; and the sensing axes being disposed at equal and opposite angles to the earpieces, and being disposed at a larger angle to each other.

BRIEF DESCRIPTION OF THE DRAWINGS

FIG. 1 is a schematic top view of a conveyance of prior art construction having left and right wheels, and a castering rear wheel, the left and right wheels being driven by left and right electric motors;

FIG. 2 is a schematic drawing of an X-Y controller of prior art construction in which potentiometers are used for transducers, and in which the potentiometers are disposed at 45 degrees to the X axis, and at 90 degrees to each other;

FIG. 3 is a top view of an X-Y controller of prior art construction showing the joystick in a full forward speed position, and showing, in phantom lines, the joystick in right turn and right pivot turn positions;

FIG. 4 is a side elevation of a head of a person wearing eyeglasses with a mercury-wiped potentiometer attached to an earpiece of the eyeglasses;

FIG. 5 is a top view of the person of FIG. 4, taken substantially as shown by view line 5—5 of FIG. 4, showing the mercury-wiped potentiometers with their pivot axes rotated at 45 degrees to X and Y axes, in which the X axis is the longitudinal axis of both the eyeglasses and the person's head;

FIG. 6 is a top view of eyeglasses in which two mercury-wiped potentiometers are attached to one earpiece of the eyeglasses. The potentiometers being usable for control of speed and steering, and a mercury-actuated tilt switch is attached to one earpiece for use as a shut-down sensor to sense excessively large angles that may indicate a seizure, fainting, or other physical, mental, or emotional problem of the operator;

FIG. 25 is a diagram of a sawtooth wave showing volts versus time, and also showing an amplified control signal selecting a pulse width;

FIG. 26 is a diagram of a pulse-width-modulated square wave showing a pulse width that has been determined by comparing an amplified control signal with a sawtooth wave;

FIG. 27 is a schematic of a prior art sawtooth generator which is used in the circuitry of the block diagram of FIG. 24, shown in detail to describe the use of a logic "high" from the limit-switch apparatus of FIG. 31;

FIG. 28 is a schematic drawing of the transducer sensitivity control apparatus of FIG. 24 that allows selective adjustment of the sensitivity of transducers used in an X-Y controller, showing conductors for connecting the transducer sensitivity control apparatus to transducers of an X-Y controller;

FIG. 29 is a schematic drawing of a voltage selection apparatus that may be used in place of the transducer sensitivity control apparatus of FIG. 28, and that may be used as a part of the limit-switch apparatus of FIG. 31;

FIG. 30 is a pictorial representation of forward and reverse voltages produced by the voltage selection apparatus of FIG. 29;

DESCRIPTION OF THE PREFERRED EMBODIMENTS

Figure 11:
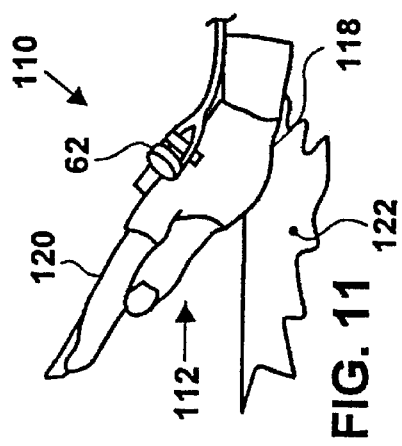
FIG. 11 Is a side elevation of the X-Y controller of FIG. 9, taken substantially as shown by view line 10—10 of FIG. 9, showing the fingers raised and the hand positioned for rearward propulsion.

The present invention provides apparatus for controlling linear and rotary actuators. An important part of tile present invention is a differential reduction apparatus, or steering sensitivity control apparatus, 156 or 180. Other parts of the present invention will be described subsequently The differential reduction apparatus, or steering sensitivity control apparatus, 156 or 180, is applicable for use in controlling speed and direction of linear actuators, and speed and direction of rotation of rotary actuators.

When used as a steering sensitivity control apparatus, the differential reduction apparatus, 156 or 180, is applicable for use with various kinds of vehicles or conveyances, such as a conveyance, or power wheelchair, 10 of FIG. 1 that schematically represents conveyances of prior art design.

A prior art wheelchair, such as the power wheelchair 10 of FIG. 1, is shown and described in Lautzenhiser et al., U.S. Pat. No. 4,906,906, issued Mar. 6, 1990.

Briefly, the conveyance 10 includes left and right wheels, 12A and 12B, that are reversibly driven by left and right electric D.C. motors, or first and second rotary actuators, 14A and 14B, that are drivingly connected to respective ones of the wheels, 12A and 12B, by left and right gear boxes, 16A and 16B.

The conveyance 10 is propelled and steered by delivering varying effective driving voltages to power cables, 18A and 18B. The electric motors, 14A and 14B, and a caster wheel 20 cooperate with the wheels, 12A and 12B, to support the conveyance 10 and to allow the wheels, 12A and 12B, to steer the conveyance 10. Prior art circuitry for providing a pulse-width driving voltage to the motors, 14A and 14B, is described in the aforesaid U.S. Pat. No. 4,906,906.

When the motors, 14A and 148, are propelling, the conveyance 10 in a forward direction 22, either wheel, 12A or 12B, may be slowed to make a turn of selected radii, or either wheel, 12A or 12B, may be stopped to provide a turn that pivots about that wheel, 12A or 12B. Further, either wheel, 12A or 12B, may be reversed to make pivot turns about a pivot axis 24. These changes in the speed of the wheels, 12A and 12B, are accomplished by changing, or reversing the polarity of, effective driving voltages applied to the motors, 14A and 14B, in any suitable manner, such as taught in the aforesaid U.S. Pat. No. 4,906,906.

A vehicle, such as tile conveyance 10 of FIG. 1, is often controlled by an X-Y controller, such as an X-Y controller 26 of FIG. 2. The X-Y controller 26 includes left and right transducers, or left and right variable resistance potentiometers, 28A and 28B, that each include a rotary shaft, 30A or 30B, and the shafts, 30A and 30B, have axes 32A and 32B that are both disposed at 45 degrees to X and Y axes. An X-Y controller 26 of this type is shown as prior art in Lautzenhiser et al., U.S. Pat. No. 5,012,165, issued Apr. 30, 1991.

Continuing to refer to FIG. 2, movement of a joystick 34 in a right-turn direction 36 that is 45 degrees clockwise of a forward direction 38 on the X axis, rotates the shaft 30B of the right potentiometer 28B in the direction of an arrow 40B, but does not rotate the shaft 30A of the left potentiometer 28A. Further, since the movement of the joystick 34 in the direction 36 is at right angles to the axis 32B of the shaft 30B, the joystick 34 has full mechanical advantage on the shaft 30B. Movement of the joystick 34 in the right-turn direction 36 results in high speed rotation of the left wheel 12A of FIG. 1, but the right wheel 12B stops, thereby producing a pivot turn around the right wheel 12B.

If the joystick 34 is moved along the X axis in the forward direction 38, both of the shafts, 30A and 30B, are rotated. The directions of rotation of the shafts, 30A and 30B, are as shown by an arrow 40A and the arrow 40B. However, the mechanical advantage of the joystick 34 is reduced by a 45 degree sin-cosine relationship. That is, both shafts, 30A and 30B, rotate for forward propulsion, but the rotation of both is only 70.7 percent, as related to the distance that the joystick 34 is moved along the X axis in the direction 38.

Therefore, if a desired speed is achieved for forward propulsion with the joystick 34 moved in the direction 38 along the X axis, moving the joystick 34 in the right-turn direction 36, which is disposed clockwise from the X axis by 45 degrees, or moving the joystick 34 in a left-turn direction 42 that is 45 degrees counterclockwise from the X axis, will increase the speed of one motor, 14A or 14B of FIG. 1, by 41 percent, and the other motor, 14B or 14A, will be stopped.

This means that with a conventional X-Y controller 26, when making turns, at the very time when it is highly desirable to slow down, the speed of the wheel, 12A or 12B, on the outside of the turn increases.

Referring now to FIG. 3, a top view of the X-Y controller 26 of FIG. 2 is shown with a cover plate 44 obscuring the potentiometers, 28A and 28B. The joystick 84 is positionable any place in a circular area 46 whose outer boundary is a circular path 48. Positioning the joystick 84 at an intersection 50 of the X axis and the circular path 48 provides forward speed of both motors, 14A and 14B of FIG. 1. Positions of the joystick 84 are defined herein as degrees clockwise or degrees counterclockwise around the circular path 48, as measured from the intersection 50.

A right turn with the left motor 14A of FIG. 1 operating at maximum speed and with the right motor 14B stopped, normally occurs when the joystick 34 is positioned at 45 degrees clockwise as indicated by an intersection 52; and a right pivot turn with the motors, 14A and 14B, operating at maximum speeds in opposite directions, normally occurs when the joystick 84 is positioned at 90 degrees clockwise, as indicated by an intersection 54.

In Lautzenhiser, U.S. Pat. No. 5,129,277, an improved X-Y controller is taught in which the relationship between a Y axis mechanical input and a Y axis electrical output, of the potentiometers is mechanically changeable by selectively changing a lever length. This changeable relationship between the Y axis mechanical input and the Y axis electrical output, minimizes the problem of the wheel, 12A or 12B, on the outside of the turn increasing in speed. However, even with this prior-art improved X-Y controller, the steering sensitivity control apparatus, 156 or 180, of the present invention provides great benefits, as will be shown.

Referring now to FIGS. 4 and 5, a person 56 is wearing an eyeglass X-Y controller 58 that includes eyeglasses, or a nose-and-ear engaging frame, or eyeglass frame, 60 with a mercury-wiped potentiometer, or mercury-wiped transducer, 62 attached to each of earpieces, 64A and 64B, by any suitable means, such as swivel mounts 66. As seen in FIG. 5, first and second sensing axes, or tilt axes, 68A and 68B, of the mercury-wiped potentiometers 62 are positioned at 45 degrees to an X axis of the eyeglasses 60, which is also the X axis of a human head or body component 70 of the person 56.

A cable 72 is attached to the mercury-wiped potentiometers 62, and is used to attach the mercury-wiped potentiometers 62 to any suitable device that will translate resistances of the potentiometers 62 into effective driving voltages. One such device is shown and described in the aforementioned U.S. Pat. No. 4,906,906.

Preferably, the steering sensitivity control apparatus, 156 or 180, of the present invention is interposed at some point in the system, as will be shown and described subsequently.

In operation, the eyeglass X-Y controller 58 is placed onto the head 70 of the person 56. The potentiometers 62 are then adjusted in accordance with positioning of the eyeglasses 60 with respect to ears, 74A and 74B, and a nose 76 to provide a zero speed when the head 70 is positioned naturally.

Tilting the head 70 in a forward direction 78, along the X axis of the head 70 and the eyeglasses 60, results in supplying equal effective driving voltages to both of the motors, 14A and 14B, of FIG. 1 proportional to inclination of the head 70, thereby driving the wheels, 12A and 12B, and propelling the conveyance 10 in the forward direction 22 at speeds that are substantially equal, and, at least somewhat, proportional to the driving voltages applied to the motors, 14A and 14B.

In like manner, tilting the head 70 in the direction of an arrow 80 provides a right turn in which the right wheel 12B of FIG. 1 stops, and tilting the head 70 in the direction of an arrow 82 results in a clockwise pivot turn of the conveyance 10 of FIG. 1 around the pivot axis 24. Reverse propulsion is achieved by tilting the head 70 opposite to the forward direction 78, and turns in reverse propulsion are achieved by tilting the head orthogonally to the X axis.

Since the eyeglasses 60 of the eyeglass X-Y controller 58 are positioned on the head 70 of the person 56 by contact with the ears, 74A and 74B, and with the nose 76, mounting the mercury-wiped potentiometers 62 to the eyeglasses 60 provides excellent alignment with the head 70 of the person 56.

Referring now to FIG. 6, an eyeglass X-Y controller 90 includes the eyeglasses or nose-and-ear engaging frame 60 with the mercury-wiped potentiometers 62 attached to the earpiece 64A. In addition, a mercury-actuated tilt switch 92 is attached to one of the earpieces, 64A or 64B. The tilt switch 92 is connected to the circuitry of the power wheelchair 10 of FIG. 1 in any suitable place that will stop the conveyance 10 whenever the head 70 of the person 56 of FIG. 4 is positioned in a manner that would indicate the possibility of a seizure, fainting, or other problem indicating inability to control the conveyance 10.

A cable 94 is attached to the mercury-wiped potentiometers 62, and is used to attach the mercury-wiped potentiometers 62 to any suitable device that will translate resistances of the potentiometers 62 into effective driving voltages. The cable 94 is also attached to the tilt switch 92 and to circuitry that controls the power wheelchair 10 of FIG. 1, as will be shown subsequently.

As seen in FIG. 6, tile sensing axes, 68A and 68B, of the potentiometers 62 of the eyeglass X-Y controller 90 are at 45 degrees to the X axis and at 90 degrees to each other.

Figure 8:
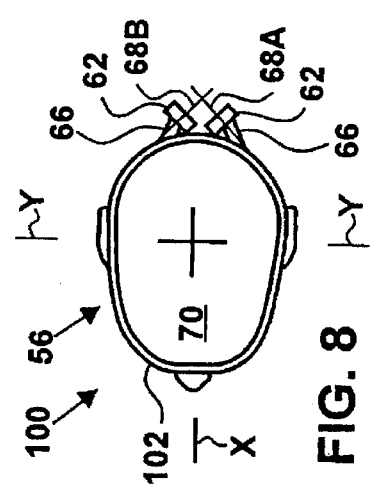
FIG. 8 is a top view of the person of FIG. 7, taken substantially as shown by view line 8—8 of FIG. 7, showing the pivot axes of the mercury-wiped potentiometers rotated at 45 degrees to X and Y axes, and in which the X axis is the longitudinal axis of both the headband and the person's head.
Figure 7:
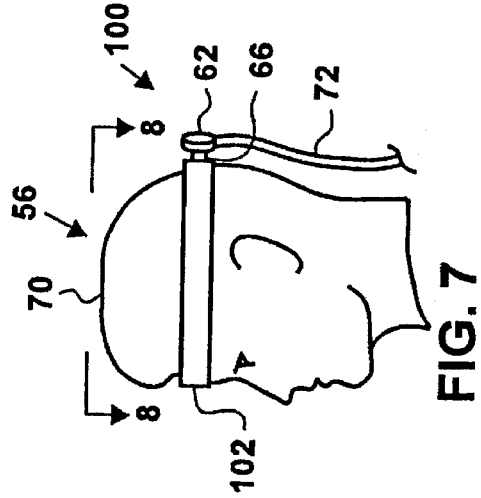
FIG. 7 is a side view of a head of a person wearing a headband with mercury-wiped potentiometers attached to the headband.

Referring now to FIGS. 7 and 8, in addition to like-numbered and like-named parts as in FIGS. 4 and 5, a headband X-Y controller, or head-engaging component, 100 is being worn on the head 70 of the person 56. The headband X-Y controller 100 includes mercury-wiped potentiometers 62 that are attached to a headband 102 by swivel mounts 66. The sensing axes, 68A and 68B, of the potentiometers 62 are positioned at 45 degree angles to an X axis of the headband X-Y controller 100, which is also the X axis of the head 70 of the person 56, and at a 90 degree angle to each other.

The cable 72 is attached to the mercury-wiped potentiometers 62, and is used to attach the mercury-wiped potentiometers 62 to any suitable device that will translate resistances of the potentiometers 62 into effective driving voltages.

Control of the conveyance 10 of FIG. 1 when using the headband X-Y controller 100 is the same as discussed for using the eyeglass X-Y controller 58 of FIGS. 4 and 5.

Figure 9:
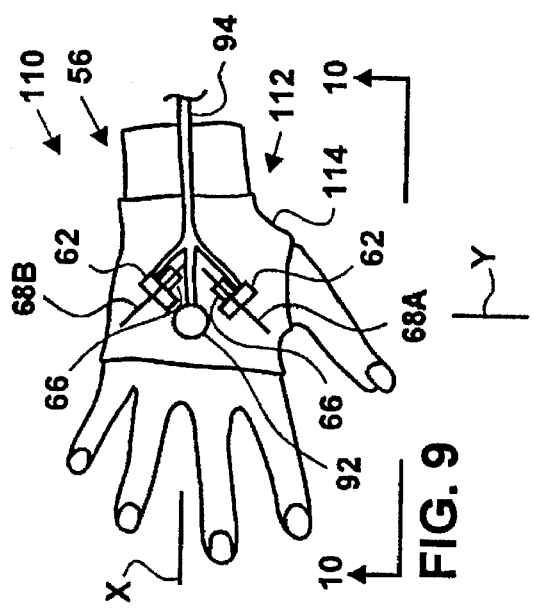
FIG. 9 is a view of a human hand with a hand-mounted X-Y controller attached, the X-Y controller including an attaching hand covering, two mercury-wiped potentiometers with pivot axes at 45 degrees to a hand axis, and a tilt switch for use as a shut-down sensor.

Referring now to FIG. 9, a hand-mounted X-Y controller 110 is attached to a human hand, or body component, 112 of the person 56. The hand-mounted X-Y controller 110 includes an attaching hand covering, or hand strap, 114, and two mercury-wiped potentiometers 62 that are attached to the hand strap 114 by swivel mounts 66 with the axes 68A and 68B of the potentiometers 62 disposed at 45 degrees to X and Y axes of the hand 112 and at 90 degrees to each other.

Optionally, as shown in FIG. 9, the hand-mounted X-Y controller 110 includes the tilt switch 92 of FIG. 6. If the tilt switch 92 is included, the cable 94 is attached to the mercury-wiped potentiometers 62, and is used to attach the mercury-wiped potentiometers 62 to any suitable device that will translate resistances of the potentiometers 62 into effective driving voltages, and the cable 94 is also used to connect the tilt switch 92 to any place in the circuitry that will stop the conveyance 10 of FIG. 1 when the tilt switch 92 is actuated. If the tilt switch 92 is not included, the cable 72 of FIG. 4 is used instead of the cable 94.

Figure 10:
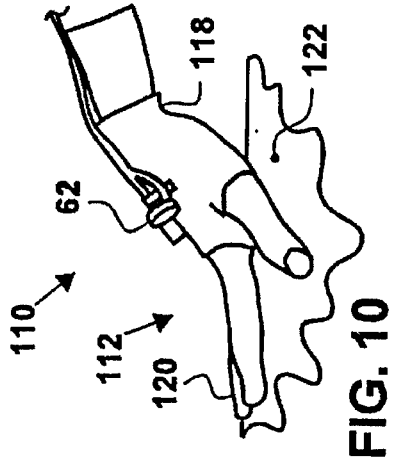
FIG. 10 is a side elevation of the human hand and hand-mounted X-Y controller of FIG. 9, taken substantially as shown by view line 10—10 of FIG. 9, showing fingers and the hand positioned for forward propulsion.

In using the hand-mounted X-Y controller 110, forward propulsion is achieved by raising a wrist 118 while resting, or pressing down, fingers 120 against a surface 122, as shown in FIG. 10. Rearward propulsion is achieved by raising fingers 120 while resting, or pressing down, the wrist 118 against the surface 122, as shown in FIG. 11.

Figure 12:
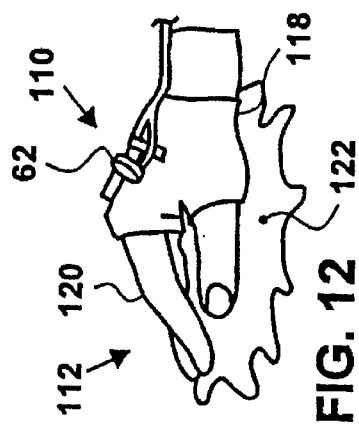
FIG. 12 is a side elevation of the X-Y controller of FIG. 9, taken substantially as shown by view line 10—10 of FIG. 9, showing fingers pulled toward the wrist as an alternate and preferred method of positioning the hand to achieve rearward propulsion.

Not only alternately, but preferably, reverse propulsion is achieved by pulling the fingers 120 toward the wrist 118 while resting, or pressing, both the fingers 120 and the wrist 118 on the surface 122, as shown in FIG. 12. Turns are achieved by rotating tile hand 112 about the axis of FIG. 9.

Since some part of the hand 112, the fingers 120 and/or the wrist 118, is resting on, or pressing down onto, the surface 122, erroneous signals produced by hand tremors are minimized.

Figure 13:
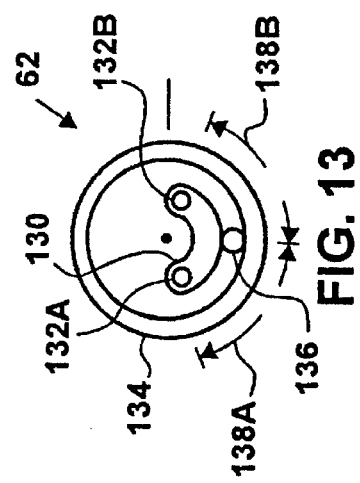
FIG. 13 is a schematic cross-sectional drawing of a mercury-wiped potentiometer for use in the embodiments of FIGS. 4–12.
Figure 14:
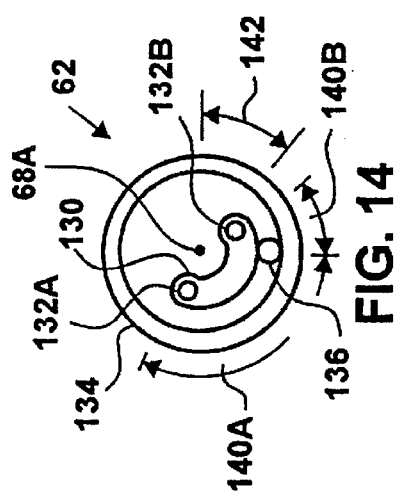
FIG. 14 is schematic cross-sectional drawing of the mercury-wiped potentiometer of FIG. 13 rotated, or tilted, at an angle about the pivot axis, showing the mercury wiper gravity positioned.

Referring now to FIGS. 13 and 14, the mercury-wiped potentiometer 62 includes a horseshoe-shaped resistance 130, end terminals 132A and 132B, a metal case 134 that hermetically encloses the horseshoe-shaped resistance 130, and a mercury ball 136 that serves as a wiper for the mercury-wiped potentiometer 62 by making contact between the metal case 134 and selectable portions, 138A and 138B, of the horseshoe-shaped resistance 130.

As shown in FIG. 14, when the mercury-wiped potentiometer 62 is rotated or tilted about the sensing axes, 68A and 68B, gravity maintains the mercury ball 136 at the lowest point in the metal case 134, thereby dividing the resistance 130 into unequal portions, 140A and 140B, in accordance with a tilt angle 142.

The mercury-wiped potentiometer is manufactured by Comus International of Nutley, New Jersey, as part number VRS 2710K sensor.

Figure 15:
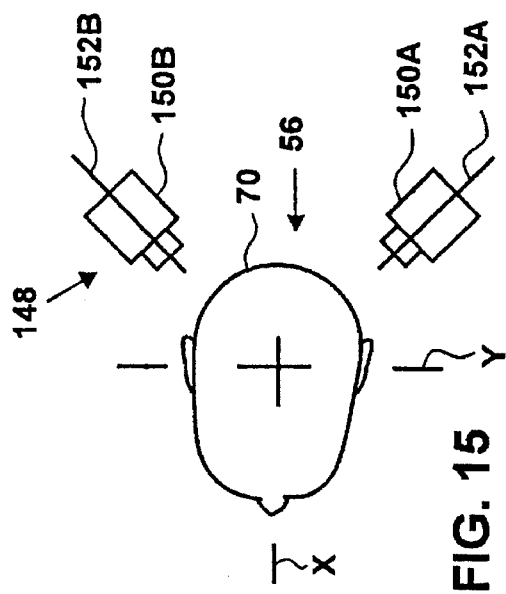
FIG. 15 is a top view of two proximity sensors positioned at 45 degrees behind an operator's head.

Referring now to FIG. 15, a proximity X-Y controller 148 includes proximity sensors, or proximity transducers, 150A and 150B, which are positioned behind the head 70 of the person 56 with first and second sensing axes, 152A and 152B, thereof positioned at 45 degrees to an X axis of the head 70. Tile proximity sensors, 150A and 150B, are of any suitable type, such as infrared, magnetic field, or ultrasonic, not an inventive part of the present invention.

While it is difficult, or even impossible, for many users to control steering and maneuverability of a vehicle or conveyance, such as the power wheelchair 10 of FIG. 1, when rising various types of X-Y controllers, such as the X-Y controllers, 26, 58, 90, 100, 110, and 148, of FIGS. 2-12 and 16, the use of all of these X-Y controllers, 26, 58, 90. 100, 110, and 148, becomes highly practical when used in conjunction with the steering sensitivity control apparatus, 156 or 180, of the present invention.

Figure 16:
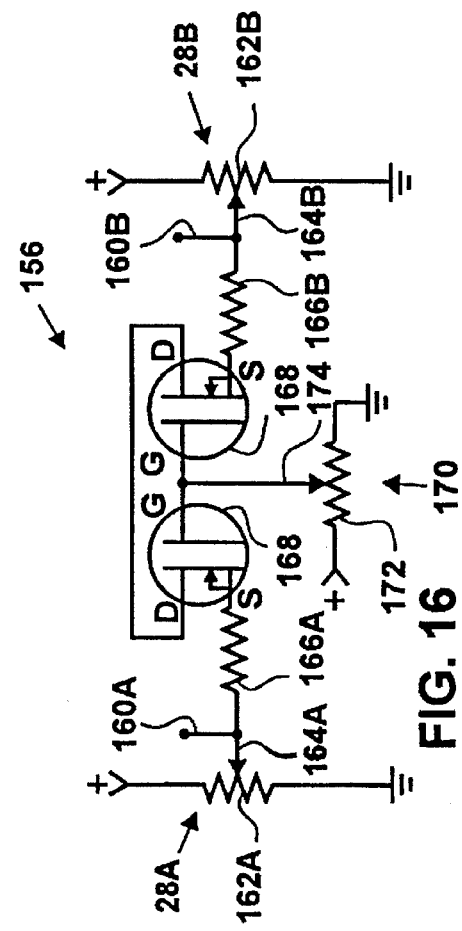
FIG. 16 is a schematic drawing of a preferred embodiment of the steering sensitivity control apparatus of the present invention in which two N-Channel FETS are connected between two potentiometers in a common-drain terminal configuration to control steering sensitivity for forward propulsion.

Referring now to FIG. 16 a differential reduction apparatus, or steering sensitivity control apparatus 156 includes all of the components shown, except for the left and right transducers, 28A and 28B, and except for output signal conductors, 160A and 160B. The output signal conductors, 160A and I60B, provide a signal that, when connected to any suitable electric control circuit, such as the circuit taught in Lautzenhiser et al., U.S. Pat. No. 4,906,906, controls power provided to the left and right motors, 14A and 14B, of FIG. 1.

It should be understood that the mercury-wiped potentiometers 62 of the eyeglass X-Y controller 68 of FIGS. 4 and 5, the mercury-wiped potentiometers 62 of the eyeglass X-Y controller 90 of FIG. 6, the mercury-wiped potentiometers 62 of the headband X-Y controller 100 of FIGS. 7 and 8, the mercury-wiped potentiometers 62 of the hand-mounted X-Y controller 110 of FIGS. 9-12, the proximity transducers 150A and 150B of the proximity X-Y controller 148 of FIG. 15, and various other types of potentiometers or transducers used in various types of X-Y controllers, such as tile prior-art X-Y controller of Lautzenhiser, U.S. Pat. No. 5,129,277, may be used.

The potentiometers, 28A and 28B, each include a resistor, 162A or 162B, and each include a wiper, 164A or 164B. The wipers, 164A and 164B, are positioned by respective ones of the shafts, 30A or 30B, of FIG. 2. Both of the potentiometers, 28A and 28B, are connected to a positive voltage and to ground, as shown in FIG. 16.

The steering sensitivity control apparatus 156 includes a pair of resisters, 166A and 166B, each resistor, 166A or 166B, being connected to a respective one of the wipers, 164A or 16413, and a pair of N-Channel field effect transistors, or N-Channel FETS, 168 that are connected to each other and to respective ones of the resisters, 166A and 166B.

Figure 17:
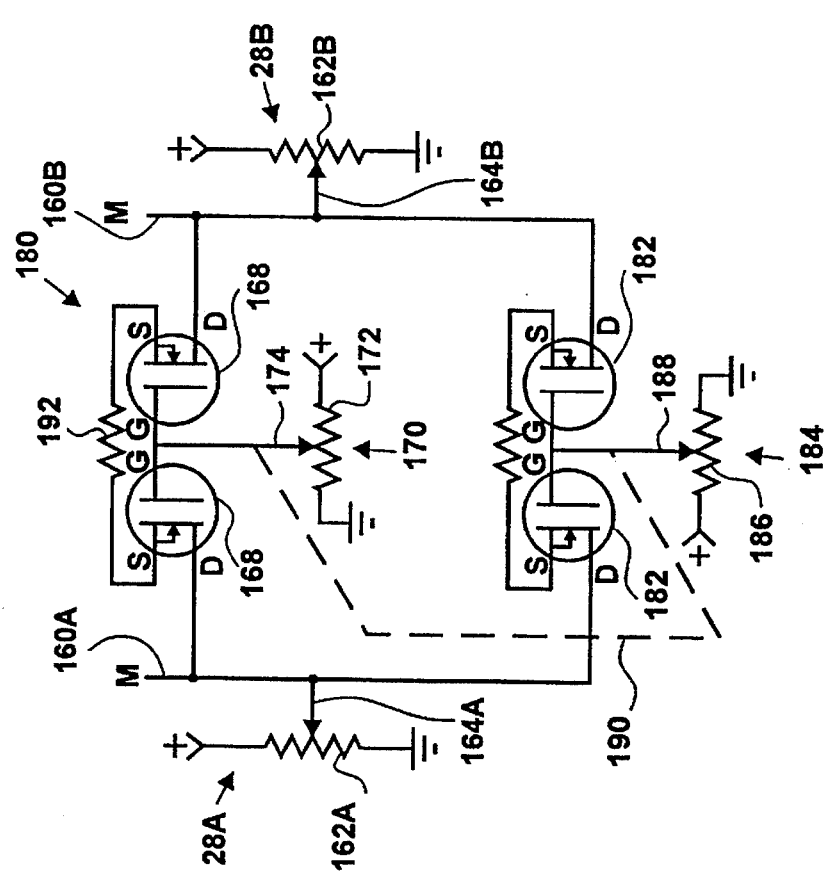
FIG. 17 is a schematic drawing of an embodiment of the present invention in which two N-Channel FETS, connected in common-source terminal configuration, control steering sensitivity in one direction, either forward or reverse, and two P-Channel FETS, also connected in common-source terminal configuration, control steering sensitivity in the other direction of propulsion.

In FIG. 16, and also in FIG. 17, source terminals of the FETS 168 are marked "S," drain terminals are marked "D," and gate terminals are marked "G."

As shown in FIG. 16, the FETS 168 are connected in a common-drain terminal D configuration, and a selectively-variable gate voltage is supplied by a potentiometer 170 that includes a variable resistor 172 and a wiper 174. The resistor 172 is connected to both an 8 volt source, not shown, not, an inventive part of the present invention, and to ground. The wiper 174 is connected to both gate terminals G.

An 8 volt source, not shown, not an inventive part of the present invention, is connected to the resisters, 162A and 162B, of both potentiometers, 28A and 28B, and the resisters, 162A and 162B, are both connected to ground.

In a typical design, the potentiometers 28A and 28B, have resistances of 10,000 ohms, the resisters, 166A and 166B, each have a resistance of 300 ohms, the variable resistor 172 has a resistance of 10,000 ohms, and the N-Channel FETS 168 are sold by Supertex, Inc., of Sunnyvale, Calif., as part number TN0 104 N3.

Referring now to FIG. 17, in addition to like-numbered and like-named parts as in FIG. 16, a differential reduction apparatus, or steering sensitivity control apparatus, 180 includes a pair of P-Channel field effect transistors, or P-Channel FETS, 182, and a potentiometer 184 having both a resistor 186 and a wiper 188. The resistor 186 is connected to an 8 volt source and to ground, and the wiper 188 is connected to both gate terminals G of the P-channel FETS 182. Optionally, as indicated by a dash line 190, the potentiometers 170 and 184 are mechanically ganged.

As shown in FIG. 17, both the N-Channel FETS 168 and the P-Channel FETS 182 are connected in common-source terminal S configuration. Further, instead of using the two resistors 166A and 166B, of FIG. 16, a single resistor 192 is used that has a resistance equal to the two resisters, 166A and 166B.

It makes very little difference in performance whether the FETS, 168 and 182, are connected in the common-drain terminal D configuration of FIG. 16 or the common-source terminal S configuration of FIG. 17.

That is, considering only the N-Channel FETS 168 of FIGS. 16 and 17, without regard to which configuration is used, one of the FETS 168 operates as a diode before and during initial turn-on of that one FET 168, so that the conductance between the wipers, 164A and 164B, is a function of the gate voltage of one FET 168 as it turns on, combined with the diode action of the other FET 168. Then, as both FETS 168 turn on, the conductance is a function of the gate voltage applied to both FETS 168 and the combined conductances of the FETS 168.

Further, as can be seen by inspection, whether the FETS 168 are connected in common-source terminal S configuration, or in common-drain terminal D configuration, current flows from the source terminal S to the drain terminal D through one FET 168, and current flows from the drain terminal D to the source terminal S of the other FET 168.

In like manner, whether one resistor 192 is used between the FETS 168 as shown in FIG. 17, or two resisters, 166A and 166B, are used as shown in FIG. 16, is of no consequence. The resisters, 166A and 166B, or 192, are used to limit coupling of the wipers, 164A and 164B, by the. FETS 168 by providing a minimum resistance therebetween.

Figure 18:
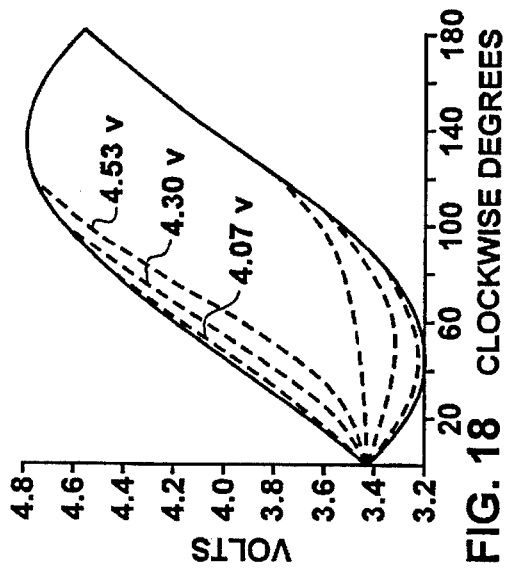
FIG. 18 is a graph of voltage versus joystick positions in clockwise degrees for both left and right potentiometers for the conventional X-Y controller of FIGS. 2 and 3, showing, in dash lines, resultant voltages versus joystick positions in clockwise degrees for three different gate voltages when used with the steering sensitivity control apparatus of FIG. 16 and the N type FETS thereof.

Referring now to FIGS. 16 and 18, solid lines on the graph of FIG. 18 show voltages produced at the wipers, 164A and 164B, when the potentiometers, 28A and 28B, are connected to an 8 volt source and when the steering sensitivity control apparatus 156 is either omitted or rendered inoperative by reduction of the voltage applied to the gate terminals G of the FETS 168.

For instance, when the joystick 3 of the X-Y controller 26 of FIGS. 2 and 3 is positioned at the intersection 50 of the X axis and the circular path 48 of FIG. 3, each of the wipers, 164A and 164B, of FIG. 16 produces 3.434 volts. When the joystick 34 is positioned 45 degrees clockwise at the intersection 52, the wiper 164B produces 3.2 volts and the wiper 164A produces 4.0 volts.

If the voltages of the wipers, 164A and 164B, as indicated by the solid lines of FIG. 18, are used to control the motors, 14A and 14B, of the conveyance 10 of FIG. 1 through the electronics taught In U.S. Pat. No. 4,906,906, a wiper voltage of 4.0 volts results in 0 volts applied to one of the motors, 14A or 14B.

As a wiper voltage reduces from 4.0 to 3.2 volts, an effective driving voltage is applied to one of the motors, 14A or 14B, of FIG. 1 that increases from zero to 12.0 volts, resulting in the maximum speed of one motor, 14A or 14B, and the respective wheel, 12A or 12B.

And as a wiper voltage increases from 4.0 to 4.8 volts, an effective driving voltage of the opposite polarity increases from 0 to 12.0 volts, and is applied to one of the motors, 14A or 14B, of FIG. 1 thereby providing maximum-speed reverse rotation of that motor, 14A or 14B, and maximum-speed reverse rotation of the respective wheel, 12A or 12B.

Continuing to refer to FIGS. 16 and 18, three dashed line curves of FIG. 18 show control signal voltages that are supplied to the output signal conductors, 160A and 160B, versus degrees of clockwise rotation of the joystick 34 of FIG. 2 when the steering sensitivity control apparatus 156 is used, and when three different gate voltages are used.

That is, the solid lines of FIG. 18 show the wiper voltages that are developed by the potentiometers, 28A and 28B, and the dash lines show the control signal voltages that result when the steering sensitivity control apparatus 156 is used, and when three different gate voltages are applied to the FETS 168.

As clearly seen by inspection of FIGS. 16 and 18, at smaller angles of rotation of the joystick 34 of FIG. 3, wherein the difference between the voltages produced by the wipers, 164A and 164B, are relatively small, the steering sensitivity control apparatus 156 produces control signal voltages that are greatly reduced from the voltages produced by the wipers, 164A and 164B.

That is, the larger of the wiper voltages is reduced by a large percentage of the difference between the two wiper voltages. And the smaller of the wiper voltages is increased by a large percentage of the difference between the two wiper voltages.

However, as the differences between the voltages produced by the wipers, 164A and 164B, increase, the steering sensitivity control apparatus 156 produces control signal voltages that vary from the wiper voltages by smaller percentages. And, at some angle of rotation of the joystick 34 of FIG. 3, the percentage of reduction reduces to zero.

For instance, as shown in FIG. 18, with 4.53 volts applied to the gate terminals G of the FETS 168 of FIG. 16, the steering sensitivity control apparatus 156 ceases to reduce the voltages developed by the wipers, 164A and 164B, when the joystick 34 is positioned at 120 degrees clockwise.

Thus the FETS 168 of FIG. 16 combine with the resistors, 166A and 166B, to reduce the difference in the voltages at the wipers, 164A and 164B, by an inverse and nonlinear function. The nonlinearity of the present invention can be seen in the fact that the steering sensitivity control apparatus 156 functions as a 600 ohm resistor at 0 degrees rotation of the joystick 34 of FIG. 3, and progressively functions as resistors of higher resistances as the joystick 34 is positioned at larger angles.

As shown in FIGS. 16 and 18, with the three different gate voltages of FIG. 18, there are three different angles of rotation of the joystick 34 of FIG. 3 at which current ceases to flow through the paired FETS 168. Thus, for all practical purposes, the steering sensitivity control apparatus 156 functions as a resistor that automatically increases from 600 ohms to infinity as the joystick 34 is positioned farther clockwise or counterclockwise from the intersection 50.

This nonlinearity provides a selectively variable decrease in steering sensitivity. With a gate voltage of 4.53 volts, the decrease in sensitivity is more than 90 percent when the joystick 34 of FIG. 3 is positioned 15 degrees clockwise or counter clockwise. Obviously, this dramatic reduction in sensitivity makes it possible for severely handicapped persons to operate the power wheelchair 10 of FIG. 1 with the joystick 34.

By adjusting the gate voltage, the steering sensitivity control apparatus 156 can be adjusted for those with very poor motor skills, can be readjusted as motor skills improve, and can be adjusted for those with excellent motor skills.

Greatly reduced steering sensitivity, as provided by the present invention, also makes practical body-component actuated X-Y controllers, such as the head-actuated, 58, 90, 100, and 148, and hand-actuated 110 X-Y controllers of FIGS. 4–12 and 15, even though the use of such X-Y controllers 58, 90, 100, 110, and 148 bas been highly impractical in the past.

As noted previously, when 90 percent reduction in steering sensitivity is achieved, the steering sensitivity control apparatus 156 is functioning as s 600 ohm resistor. If the apparatus 156 continued to operate as a 600 ohm resistor, there would be no problem in achieving maximum conveyance speeds, because both wipers, 164A and 164B, would produce the same voltages and the 600 ohm resistance would make no difference in the wiper voltages.

However, if the apparatus 156 continued to operate as a 600 ohm resistor when attempting to make a pivot turn with the wheels, 12A and 12B, of FIG. 1 rotating in opposite directions, instead of the voltage of the wipers, 164A and 164B, being 3.2 and 4.8 volts, these voltages would be 3.90 and 4.10 volts. Clearly, if the apparatus 156 functioned as a fixed resistance, it would be impossible to obtain 90 percent reduction in steering sensitivity and still be able to sharply maneuver the conveyance, or power wheelchair, 10 of FIG. 1.

In fact, there is no resistance small enough to produce a significant decrease in steering sensitivity that will not also degrade steering performance far beyond acceptable limits.

For instance, instead of a 90 percent reduction in steering sensitivity that occurs when the joystick 34 of FIG. 3 is positioned at 15 degrees, when the joystick 34 is positioned at 90 degrees clockwise for pivoting about the pivot axis 24 of FIG. 1, there is a reduction in voltage difference between the wipers, 164A and 164B, of only 24 percent. When the reduction in voltage difference is 24 percent, the steering sensitivity control apparatus 156 is operating as a 15,000 ohm resistor.

Or, with the gate voltage reduced from 4.53 volts to 4.30 volts, there is a reduction of steering sensitivity of 55 percent when the joystick 34 of FIG. 3 is positioned at 15 degrees, but there is a reduction of voltage difference between the wipers, 164A and 164B, of only 5.5 percent when the joystick 34 is positioned at 90 degrees. When the reduction in voltage is only 5.5 percent, the steering sensitivity control apparatus 156 is operating as an 98,000 ohm resistor.

Therefore, by setting the potentiometer 170 to provide gate voltages to the N-Channel FETS 168 between 4.07 and 4.53 volts, a reduction in steering sensitivity of up to 90 percent can be selectively chosen. Even higher percentages can be achieved by changing parameters used in the steering sensitivity control apparatus 156, and especially by reducing the resistances of the resisters, 166A and 166B.

Figure 19:
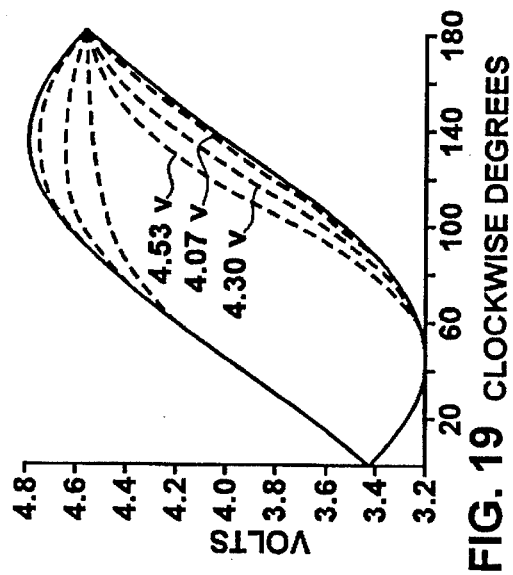
FIG. 19 is a graph of voltage versus joystick positions in clockwise degrees for both left and right potentiometers for the conventional X-Y controller of FIGS. 2 and 3, showing, in dash lines, resultant voltages versus joystick positions in clockwise degrees for three different gate voltages when used with the portion of the steering sensitivity control apparatus of FIG. 17 that includes the P type FETS thereof.

Referring now to FIG. 19 and to the steering sensitivity control apparatus 180 of FIG. 17 in which both the N-Channel 168 and the P-Channel 182 FETS are shown, if the N-Channel FETS 168 are omitted, and only the P-Channel FETS 182 are included, the dash lines of FIG. 19 show the resultant control signal voltages versus degrees of rotation of the joystick 34 of FIG. 3 for three different gate voltages.

Comparing the curves of FIGS. 18 and 19, it can be seen that the use of the P-Channel FETS 182 produces results similar to that of the N-Channel FETS 168 of FIG. 16, but that the resultant curves are a mirror image of the N-Channel FETS 168 of FIG. 16.

Figure 20:
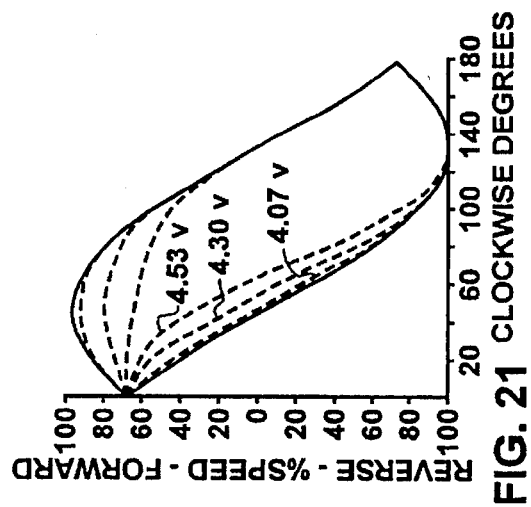
FIG. 20 is a graph of voltage versus joystick positions in clockwise degrees for both left and right potentiometers for the conventional X-Y controller of FIGS. 2 and 3, showing, in dash lines resultant voltages versus joystick positions in clockwise degrees for three different gate voltages when used with the steering sensitivity control apparatus of FIG. 17 and both the N and P type FETS thereof.

Referring now both to FIG. 20 and the steering sensitivity control apparatus 180 of FIG. 17, if both the N-Channel FETS 168 and the P-Channel FETS 182 are included, the dash lines of FIG. 20 show the resultant control signal voltages that are produced by three different gate voltages applied to the N-Channel FETS 168 and another three gate voltages applied to the P-Channel FETS 182.

Referring now to FIGS. 18–20 and 22, all of which show control signal voltages versus position of the joystick 34 in clockwise degrees, it can be seen that if a system is designed in which a reduction in control signal voltage produces an increase in forward speed, the N-Channel FETS 168 should be used if a system is designed in which an increase in control signal voltage produces an increase in forward speed, the P-Channel FETS 182 should be used, and if steering sensitivity control is desired for both forward and reverse propulsion, both the N-Channel 168 and the P-Channel 182 FETS should be used.

Figure 21:
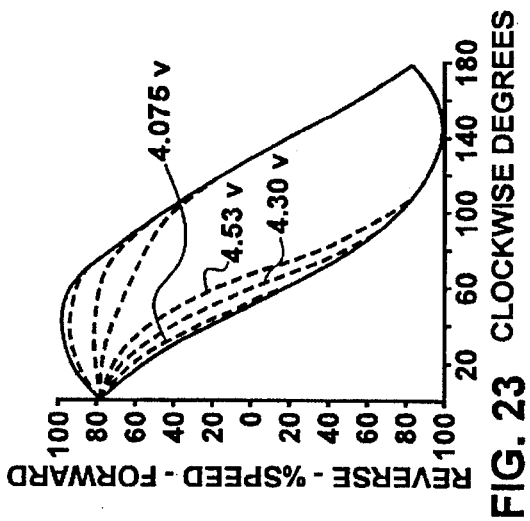
FIG. 21 is a graph of conveyance speed versus joystick positions in clockwise degrees for both left and right potentiometers for the conventional X-Y controller of FIGS. 2 and 3, showing, in dash lines, resultant conveyance speeds versus joystick positions in clockwise degrees for three different gate voltages when used with the steering sensitivity control apparatus of FIG. 16.

Referring now to FIGS. 16 and 21, the solid line on the graph of FIG. 21 shows percentage of speed versus degrees of clockwise rotation of the joystick 34 of FIG. 3 for the left and right motors, 14A and 14B, of FIG. 1 when the steering sensitivity control apparatus 156 is either omitted or the gate voltages are adjusted to make the apparatus 156 inoperative. The three curves in dash lines show percentages of maximum speed for the left and right motors, 14A and 14B, when the steering sensitivity control apparatus 156 of FIG. 16 is used, and when gate voltages of 4.53, 4.30, and 4.07 are used.

As shown by the solid lines in FIG. 21, and as previously mentioned, when the joystick 34 of FIG. 3 is positioned at the intersection 50 of the X axis and the circular path 48, the motors, 14A and 14B, of FIG. 1, both receive effective driving voltages that are 70.7 percent of maximum, so both motors, 14A and 14B, operate at roughly 70.7 percent of maximum speed, dependent, of course, upon loads placed on the motors, 14A and 14B, and also dependent upon the use of a feedback system to modify the usual curve of speed versus lead for the D.C. motor, 14A or 14B.

A feedback system for selectively changing the curve of speed versus lead for the D.C. motor, 14A or 14B, is shown in Lautzenhiser, U.S. Pat. No. 5,270,624.

But when the joystick 34 of FIG. 3 is positioned 45 degrees clockwise, with a gate voltage of 4.07 volts applied to the FETS 168, instead of being given 70.7 percent of the maximum effective driving voltage, the effective driving voltage, and thus also the speed, of the left motor 14A of FIG. 1 increases to 100 percent, and the speed of the right motor 14B decreases to zero. Thus, as a natural function of the construction of X-Y controllers, such as the X-Y controller 26 of FIG. 2, the speed of the wheelchair 10 of FIG. 1 will increase by 41 percent when making turns. At the very time when reduction of speed would add to both ease of control and safety, the speed increases.

However, continuing to refer to FIGS. 16 and 21, with a gate voltage of 4.30 volts applied to the FETS 168, instead of a 41 percent increase in speed with the joystick 34 of FIG. 3 positioned at 45 degrees, the increase in speed is only 16 percent. And with a gate voltage increased to 4.53 volts, instead of a 41 percent increase in speed, the speed of the outside motor, 14A or 14B, of FIG. 1 decreases by 9 percent, providing not only ease of control but also safety of operation.

Figure 22:
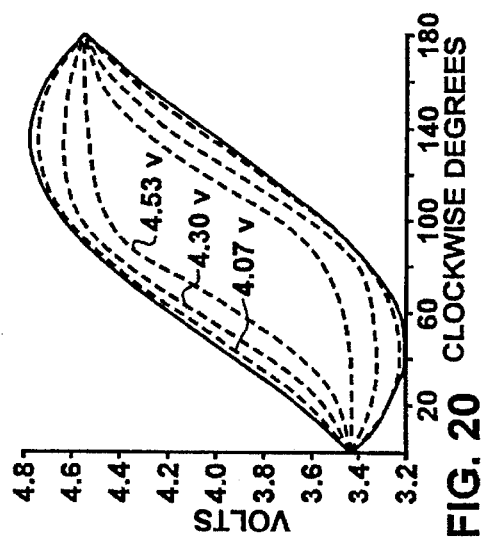
FIG. 22 is a graph of voltage versus joystick positions in clockwise degrees for both left and right potentiometers for the improved prior art X-Y controller of Lautzenhtser et al., U.S. Pat. No. 5,012,165, showing, in dash lines, resultant voltages versus joystick positions in clockwise degrees for three different gate voltages when used with the steering sensitivity control apparatus of FIG. 16.

Referring now to FIG. 22, the curves in solid lines show voltages produced at the wipers of the potentiometer of the improved prior art X-Y controller of U.S. Pat. No. 5,012,165. In this improved prior art X-Y controller, the mechanical mechanism can be selectively changed to provide three different selected ratios of movement of the joystick 34 to Y axis output.

The solid line curves of FIG. 22 show wiper volts for this improved X-Y controller when the mechanical mechanism is adjusted to produce the higher of two reduced Y axis outputs.

Referring now to FIGS. 18 and 22, the differences between the voltages produced at the wipers of this improved prior art X-Y controller change more slowly, at rotations of the joystick 34 near the X axis, than the conventional prior art X-Y controller of FIG. 18. Therefore, this improved prior-art X-Y controller significantly reduces steering sensitivity, and significantly increases ease of steering control, even when used without using the steering sensitivity control apparatus, 156 or 180, of FIGS. 16 and 17 of the present invention.

Continuing to refer to FIG. 22, three sets of dash lined curves show two control signal voltages, one for control of the left motor 14A of FIG. 1, and the other for control of the right motor 14B, that are produced by three different gate voltages.

Figure 23:
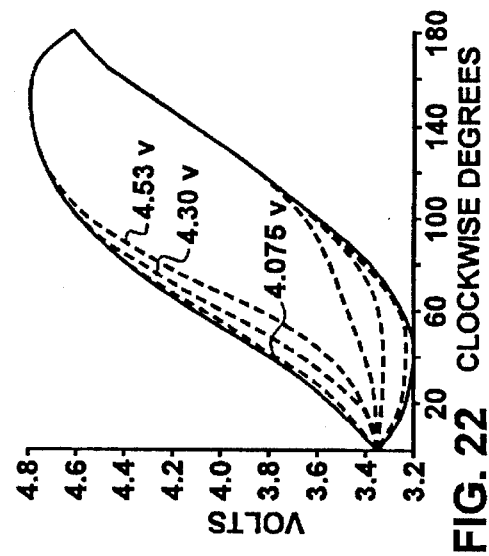
FIG. 23 is a graph of conveyance speed versus joystick positions in clockwise degrees for both left and right potentiometers for the improved prior art X-Y controller of Lautzenhtser et al., U.S. Pat. No. 5,012,165, showing, in dash lines, resultant conveyance speeds versus joystick positions in clockwise degrees for three different gate voltages when used with the steering sensitivity control apparatus of FIG. 16.

Referring now to FIG. 23, the solid line curves show percentage of maximum speed versus position of the joystick 34 in clockwise degrees for the improved X-Y controller used to produce the voltages of FIG. 22.

Referring to FIGS. 21 and 23, the percentage of speed versus the position of the joystick 34 of the improved prior art X-Y controller changes more slowly for rotations of the joystick 34 near the X axis than it does when a conventional X-Y controller is used, thereby showing again that this approved prior art controller significantly reduces steering sensitivity, even when used without the steering sensitivity control apparatus, 156 or 180, of FIGS. 16 and 17 of the present invention.

Continuing to refer to FIG. 23, the three pairs of dashed lines show the control signal voltages that result from using three different gate voltages. With a gate voltage of 4.30, the speed of the motor, 14A or 14B, of FIG. 1 on the outside of the turn increases only 6.4 percent, from 78 to 83 percent of maximum speed as the position of the joystick 34 is rotated from 0 to 45 degrees. With a gate voltage of 4.53, the speed of the motor, 14A or 14B, on the outside of the turn reduces by 14.7 percent, from 78 percent of maximum speed to 68 percent.

However, the improvement in performance is even greater than shown above. As pointed out previously, the conveyance 10 of FIG. 1 pivots around one wheel, 12A or 12B, when the speed of one motor, 14A or 14B, is zero, and zero speed occurs when the control signal voltage controlling that motor, 14A or 14B, is 4.0 volts. And the conveyance 10 pivots around the pivot axis 24 when the voltages applied to the motors, 14A and 14B, are equal.

Referring now to FIG. 18 and to the three sets of dash lines, it can be seen that, instead of a control signal voltage of 4.0 volts occurring at 45 degrees, as does the wiper voltage of a conventional X-Y controller, a 4.0 volt control signal occurs at 47 degrees, 54 degrees, or 64 degrees, at gate voltages of 4.07, 4.30, or 4.53, respectively, when the steering sensitivity control apparatus 156 of FIG. 16 is used.

Therefore, a turn in which one wheel, 12A or 12B, pivots around the other wheel, 12B or 12A, that is stopped, occurs at angles up to 64 degrees, as opposed to 45 degrees with the conventional wheelchair 10. This means that steering control is distributed over as much as 42 percent more of the circular path 48, thereby providing greater ease of control.

And, referring now to FIG. 19, with a gate voltage of 4.53 volts, as the 4.0 control signal voltage of FIG. 18 occurs at 64 degrees rotation of the joystick 34, the speed of the motor, 14A or 14B, of FIG. 1 that is on the outside of the turn decreases 14 percent.

A pivot turn about the pivot axis 24 of FIG. 1 occurs when the voltages applied to the motors, 14A and 14B, are equal in magnitude but opposite in direction. These equal but opposite polarity voltages occur when the control signal voltages vary equally from 4.0 volts. Thus, it can be seen by inspection of FIG. 19 that when the joystick 34 of FIG. 3 of conventional prior-art construction is used, wiper voltages are equidistant from 4.0 volts when the joystick 34 is positioned at 90 degrees.

By inspection of FIG. 18, it can be seen that when a gate voltage of 4.53 is used for the steering sensitivity control apparatus 156 of FIG. 16, the conveyance 10 of FIG. 1 will pivot about the pivot axis 24 when the joystick 34 of FIG. 3 is positioned at 90 degrees, as it also did without the use of the apparatus 156.

However, as can be seen by inspection of FIG. 18, with a gate voltage of 4.53, and with the joystick 34 of FIG. 3 positioned at 90 degrees, both of the motors, 14A and 14B, of FIG. 1 will rotate at 53 percent of maximum speed, thereby automatically providing safe pivot turns.

Figure 24:
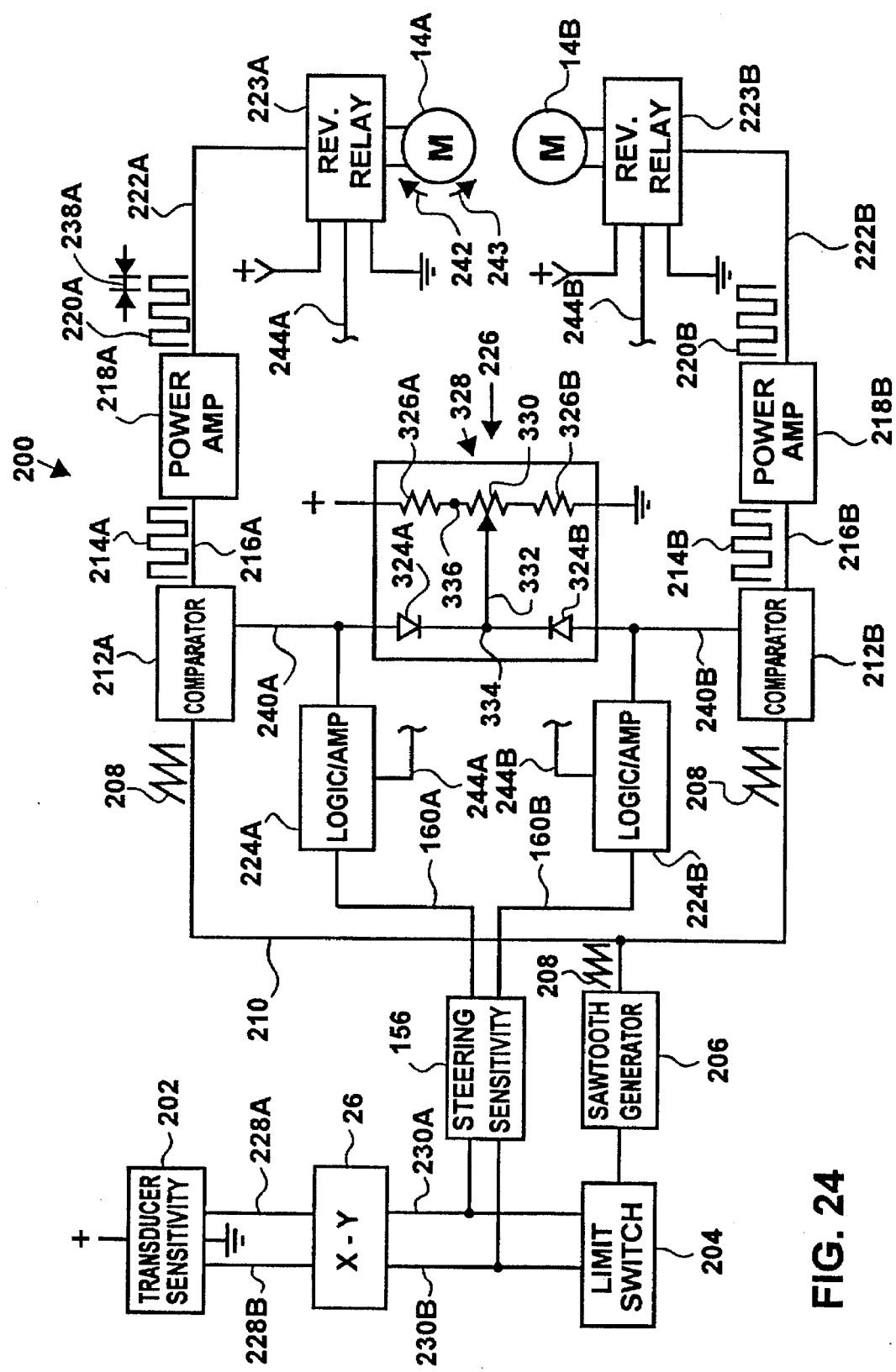
FIG. 24 is a block diagram showing portions of the present invention including the steering sensitivity control apparatus, the transducer sensitivity control apparatus, the limit-switch apparatus, and the signal limiting apparatus that provides adjustable speed-limiting being shown as a schematic drawing.
Figure 31:
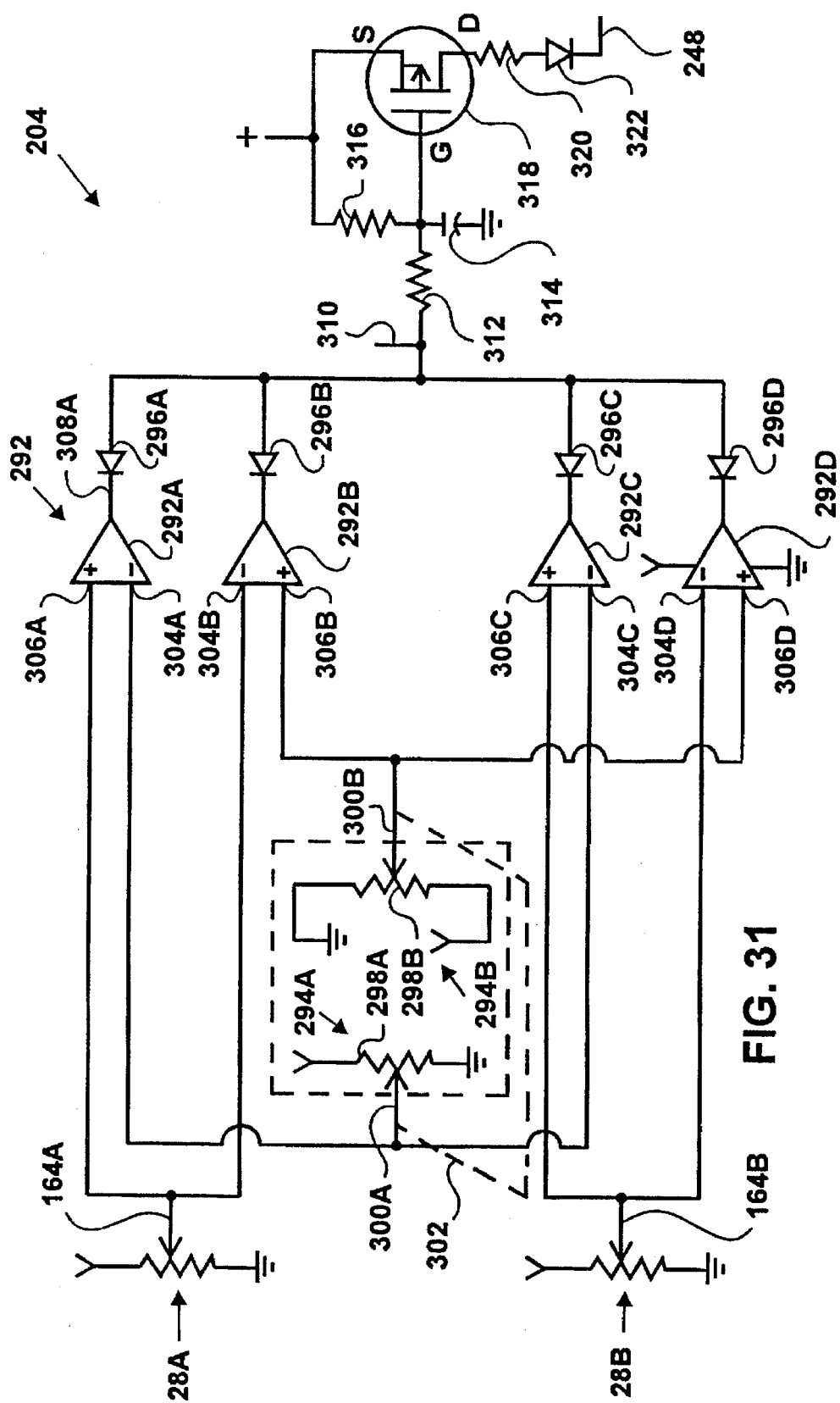
FIG. 31 is a schematic drawing of a limit-switch apparatus of the present invention in which either a logic "low" or a logic "high" can be used to stop a conveyance when an output of an X-Y controller indicates, by an abnormally high output, the possibility of fainting, stroke, or other impairment that would prevent safe control of a conveyance.

Referring now to FIG. 24, a control system 200, shown as a block diagram, includes a transducer sensitivity control apparatus 202, the X-Y controller 26 of FIG. 2, a limit switch apparatus 204 of FIG. 31, a sawtooth generator, 206 that produces a sawtooth wave 208 of FIG. 25, and a conductor 210 that delivers the sawtooth wave 208 to comparators 212A and 212B.

The sawtooth generator 206 is a standard relaxation circuit that can be found, and that is filly described, in both electronic textbooks and electronic handbooks, therefore a detailed description is unnecessary.

The comparators, 212A and 212B, produce pulse-width-modulated square waves, or control signals, 214A and 214B of FIG. 26, conductors, 216A and 216B, deliver the pulse-width-modulated waves 214A and 214B, and power amplifiers, 218A and 218B, reproduce the pulse-width-modulated waves, 214A and 214B, with greater power as pulse-width-modulated driving voltages, or effective driving voltages, 220A and 220B.

Although not a part of the system 200, the motors, 14A and 14B of FIG. 1, are shown connected to the pulse-width-modulated driving voltages, 220A and 220B of the power amplifiers, 218A and 218B, by conductors, 222A and 222B, and by reversing relays, 223A and 223B.

The control system 200 also includes the steering sensitivity control apparatus 156 of FIG. 16, logic/amplifiers, 224A and 224B, and a signal limiting apparatus 226.

Operation of the control system 200 of FIG. 24 is as follows: the transducer sensitivity control apparatus 202 is connected to an 8.0 volt source and to ground. The transducer sensitivity control apparatus 202 produces two voltages. One of these voltages is lower than the source voltage by an adjustably selectable value, and the other is higher than ground by the same value. These higher and lower voltages are delivered to the X-Y controller 26 by conductors, 228A and 228B, respectively, and these two voltages are used across the transducers, such as the potentiometers, 28A and 28B of FIG. 17 of the X-Y controller 26.

By providing selectively decreasing voltage differentials across the potentiometers, 28A and 28B of FIG. 17, the transducer sensitivity control apparatus 202 provides means for selectively reducing the sensitivity of the potentiometers in an X-Y controller, such as the potentiometers, 28A and 28B of FIG. 17 of the X-Y controller 26 of FIG. 2, or the mercury-wiped potentiometer 62 of the eyeglass X-Y controller 58 of FIGS. 4 and 5.

Stated another way, when a voltage is placed across the potentiometer 62 of FIG. 5, the transducer sensitivity control apparatus 202 reduces volts per degree of the tilt angle 142 of FIG. 14.

When used with the mercury-wiped potentiometer 62 of FIG. 5, the transducer sensitivity control apparatus 202 reduces tilt-angle sensitivity of the potentiometers 62. That is, it reduces the change in volts per degree of the tilt angle 142 of FIG. 14.

Both outputs of the X-Y controller 26 of FIG. 2 are delivered by conductors, 230A and 230B, to both the steering sensitivity control apparatus 156 and the limit switch apparatus 204.

The steering sensitivity control apparatus 156 develops control signals in the output signal conductors, 160A and 160B, as taught in conjunction with FIG. 16. That is, the steering sensitivity control apparatus 156 decreases differences between the signals received from the X-Y controller 26.

As shown in FIGS. 24 and 25, the comparator 212A compares an amplified control signal 232A with the sawtooth wave 208, and selects a pulse width 234A proportional to the magnitude of the amplified control signal 232A, so that the output of the comparator 212A is the pulse-width-modulated square wave 214A that has a pulse width 36A, as shown in FIG. 26.

The pulse-width modulated square wave 214A of FIG. 26 is power amplified by the power amplifier 218A and delivered to the motor 14A of FIG. 1 as the pulse-width-modulated driving voltage 220A and a pulse width 238A of FIG. 24 that is identical to the pulse width 36A of FIG. 26.

More particularly, tile control signals, 214A and 214B, from the transducer sensitivity control apparatus 202 are delivered to the logic/amplifiers, 224A and 224B, by the conductors, 160A and 160B, and the logic/amplifiers, 224A and 224B, develop the amplified control signal 232A and an amplified control signal 232B as shown in FIG. 25. The amplified control signals, 232A and 232B, in conductors, 240A and 240B, are delivered to the comparators, 212A and 212B.

The logic/amplifiers, 224A and 224B, perform two functions. One function is to amplify the power of the output received from the steering sensitivity control apparatus 156 of FIG. 16. The other function is to provide a subtraction and logic step.

in the subtraction and logic step, the logic/amplifiers, 224A and 224B, provide a subtraction function, so that the amplified control signals, 232A and 232B, in the conductors, 240A and 240B, are the absolute difference between the outputs received from the steering sensitivity control apparatus 156 of FIG. 16 and 4.0 volts.

That is, if the steering sensitivity control apparatus 156 of FIG. 16 delivers 3.8 volts to the logic/amplifier 224A, the logic/amplifier 224A supplies a control signal 232A of 0.2 volts to the comparator 212A. And, if the steering sensitivity control apparatus 156 delivers 4.2 volts to the logic/amplifier 224A, tile logic/amplifier 224A again delivers a control signal 232A of 0.2 volts to the comparator 212A. In both instances, the 0.2 volt control signal 232A determines the pulse width 234A or a pulse width 234B of FIG. 25 and the speed of the motor 14A. However, in these two examples, even though the speed of the motor 14A is the same, the direction of rotation of the motor 14A is different.

More particularly, when the steering sensitivity control apparatus 156 of FIG. 16 delivers an output of 3.8 volts and the logic/amplifier 234A produces a control signal 232A of 0.2 volts, the motor 14A runs in a forward-rotation direction 242. When the steering sensitivity control apparatus 156 delivers an output of 4.2 volts and the logic/amplifier 224A again produces a control signal 232A of 0.2 volts, the motor 14A runs in a reverse-rotation direction 243.

Control of the direction of rotation of the motors, 14A and 14B, is accomplished by the logic/amplifiers, 224A and 224B and by the reversing relays, 223A and 223B.

That is, depending upon whether an output from the steering sensitivity control apparatus 156 of FIG. 16 is above or below 4.0 volts, a rotation-direction signal is produced by one of the logic/amplifiers, 224A or 224B, in a reversing conductor, 244A or 244B, that is attached to a respective one of the reversing relays, 223A or 223B. As shown, the reversing relays, 223A or 223B, receive power by connection to a voltage source and to ground, and tile reversing relays, 223A and 223B, are controlled by signals received in the respective ones of the reversing conductors, 244A and 244B, from the logic/amplifiers 224A and 224B. The function of the reversing relays, 223A and 223B, is to reverse the polarity of the pulse-width-modulated driving voltages, 220A and 220B, as applied to the motors, 14A and 14B.

The particular manner in which the logic/amplifiers, 224A and 224B, function is not an inventive portion of the present invention, and so a detailed description is unnecessary. However, for those interested, a detailed description is included in U.S. Pat. No. 4,906,906.

This condition of developing the pulse-width modulated square wave 236A of FIG. 26 whose widths 240A are proportional to the magnitudes of the amplified control signal 232A continues until an overrange condition is signaled by the limit switch apparatus 204.

When the limit switch apparatus 204 senses an overrange condition of a transducer, such as the potentiometer 62 of FIGS. 4 and 5, a logic "high" is delivered from the limit switch apparatus 204 to a negative input 245 of an operational amplifier 246 of the sawtooth generator 206 of FIG. 27, which shows the conductor 210 of FIG. 24, by a conductor 248. The raising of the potential at the negative input 245 raises the sawtooth wave 208 with respect to a reference voltage 250 of FIG. 25.

As can be seen by inspection of FIG. 25, raising the sawtooth wave 208 of FIG. 27 with respect to the reference voltage 250 decreases the pulse width 234A, thereby also reducing the pulse width 236A of FIG. 26.

The logic "high" of the limit switch apparatus 204 of FIG. 24 raises the sawtooth wave 208 sufficiently to decrease the pulse width 234A to zero, thereby also decreasing the pulse width 236A of FIG. 26 to zero, so that a driving voltage is no longer delivered to the motor 14A.

Referring now to FIG. 28, the transducer sensitivity control apparatus 202 includes potentiometers, 252A and 252B, having resisters, 254A and 254B, wipers, 256A and 256B, and the conductors, 228A and 228B, of FIG. 24. The resisters, 254A and 254B, have first ends, 258A and 258B, that are connected respectively to an 8 volt positive potential and to ground.

The resisters, 254A and 254B, also include second ends, 260A and 260B, that are connected to a resistor 262 of a trim potentiometer 264. A wiper 266 of tile trim potentiometer 264 is also connected to the second end 260A of the resistor 254A so that the trim potentiometer 264 functions as a variable resistance between the ends, 260A and 260B. As shown by a phantom line 268, the wipers, 256A sad 256B, of the potentiometers, 252A and 252B, are mechanically ganged.

Resistances of the resistors, 254A and 254B, are equal and linear, so that movement of the mechanically ganged wipers, 256A and 256B, result in equally changed voltages at the wipers, 256A and 256B.

In operation, as can be seen by inspection, if the wipers, 256A and 256B, move toward the trim potentiometer 264, voltages at the wipers, 256A and 256B, move closer to each other. Conversely, if the wipers, 256A and 256B, move farther away from the trim potentiometer 264, the voltages at the wipers, 256A and 256B, are more nearly equal to the source and ground voltages, respectively.

Thus, it can be seen that at any positioning of the wipers, 256A and 256B, voltages selected by the wipers, 256A and 256B, are always equidistant from the source and ground voltages respectively.

When voltages of the wipers, 256A and 256B, are applied to the potentiometers, 28A and 28B of FIG. 16, by the conductors, 228A and 228B of FIG. 24, in place of the source and ground potentials shown in FIG. 16, and if the wipers, 164A and 164B, are positioned to deliver 4 volts to the steering sensitivity control apparatus 156 of FIG. 16, this voltage at the wipers, 164A and 164B, will remain constant with any adjustment of the wipers, 256A and 256B of FIG. 28.

Thus, by equally decreasing and increasing the voltages applied to the resistor 162A of FIG. 16, the sensitivity of an X-Y controller, such as the X-Y controllers, 26 or 58 of FIGS. 2 or 5, can be adjustably selected without changing a zero speed or null position of the X-Y controllers, 26 or 58.

Therefore, the transducer sensitivity control apparatus 202 provides means for electrically changing proportionality of output versus input of transducers, such as the transducers, 26 or 58 of FIGS. 2 or 5, without changing either the X or Y zero speed inputs.

Further, when the mercury-wiped potentiometers 62 of FIG. 14 are used in an X-Y controller, such as the eyeglass X-Y controller 58 of FIGS. 4 and 5, the transducer sensitivity control apparatus 202 provides means for electrically changing the proportionality of output versus tilt angle 142 of transducers, such as the mercury-wiped transducers 62, without changing zero speed tilt angles 142.

Referring now to FIG. 29, a voltage selection apparatus 270 includes potentiometers, 272A and 272B, wipers, 273A and 273B, resistors, 274A and 274B, and a resistor 276. The potentiometers, 272A and 272B, are mechanically ganged, as shown by a phantom line 277. As shown, the resistor 274B is connected to a positive source and to a resistor 278B of the potentiometer 272B, the resistor 278B is connected to the resistor 276, the resistor 276 is connected to a resistor 278A of the potentiometer 272A, the resistor 278A is connected to the resistor 274A, and the resistor 274A is connected to ground.

FIG. 30 shows a graph of wiper voltages versus positioning of wipers, 273A and 273B of FIG. 29 of the mechanically ganged potentiometers, 272A and 272B, when the resistors, 274B, 278B, 276, 278A, and 274A have resistances of 22,000 ohms, 10,000 ohms, 5,200 ohms, 10,000 ohms, and 22,000 ohms, respectively.

More particularly, the wiper 278A produces voltages that vary from 3.7 to 2.5 volts, and the wiper 278B produces voltages that vary from 4.3 volts to 5.5 volts. It can be seen both graphically and mathematically that, at all positions of the mechanically-ganged wipers, 278A and 278B, the voltages of the wipers, 278A and 278B, are equidistant from 4.0 volts.

The voltage selection apparatus 270 may be used in place of a portion of the limit switch apparatus 204 of FIG. 31, as will become evident.

Referring now to FIG. 31, the limit switch apparatus 204 includes a quad comparator 292, potentiometers, 294A and 294B, and four diodes, 296A, 296B, 296C, and 296D. The quad comparator 292 includes four comparators, numbered 292A, 292B, 292C, and 292D. The quad comparator 292 is sold as LM 339 by Motorola, Inc. of Phoenix, Ariz. The potentiometers, 294A and 294B, include resistors, 298A and 298B, and wipers, 300A and 300B. Preferably, as indicated by a phantom line 302, the wipers, 300A and 300B, are mechanically ganged for simultaneous adjustment.

The schematic drawing of FIG. 31 includes parts that function with, but are not a part of, the limit switch apparatus 204. The potentiometers. 28A and 28B of FIG. 16. are a part of an X-Y controller, such as the X-Y controller 26 of FIG. 2, and the respective output signal conductors. 160A and 160B, are included in FIG. 16.

As shown in FIG. 31, both of the resistors, 298A and 298B, of the potentiometers, 294A and 294B, are connected to a voltage source and to ground, and they are connected so that movement of the wipers, 300A and 300B, in the same direction results in one of the wipers, 300A or 300B, selecting a higher voltage and the other of the wipers, 300B or 300A, selecting a lower voltage.

When the potentiometers, 294A and 294B, are mechanically ganged as shown by the phantom line 302 and both resistors, 298A and 298B, are connected to an 8.0 volt source, with the resistors, 298A and 298B. being linear, and both wipers, 300A and 300B, are able to select 4.0 volts at the same time, then as the wipers, 300A and 300B, are moved together, voltages selected by the wipers, 300A and 300B, are always equidistant from 4.0 volts.

As now becomes evident, the voltage selection apparatus 270 of FIG. 29 can be substituted for the potentiometers 294A and 294B.

As noted earlier, when voltages selected by wipers, such as the mercury balls 136 of the mercury-wiped potentiometers 62 of FIG. 14, vary from 3.2 to 4.8 volts, both the speed and direction of the motors. 14A and 14B of FIG. 1, are controlled. With 4.0 volts at a wiper, such as the mercury ball 136. one of the motors, 14A or 14B, stops.

If the person 56 of FIG. 4 is using the eyeglass X-Y controller 90 of FIG. 6 with the mercury-wiped potentiometer 62 thereof, tilting of the head 70 can result not only in wiper voltages within the range of 3.2 to 4.8 volts, but also in voltages both smaller than 3.2 volts and larger than 4.8 volts.

The limit switch apparatus 204 uses voltages that are beyond those normally used for control of forward and reverse speeds, as selectively set by the speed limiting apparatus 226, to sense the possibility that the person 66 of FIG. 4 operating the conveyance 10 of FIG. 1 is unable to control the conveyance 10 safely because of stroke, seizure, fainting, or other temporary or permanent problem.

Referring now to FIGS. 24 and 31, assume that the wiper 300A of FIG. 31 is positioned to produce 3.0 volts, and assume that the wiper 300B is positioned to produce 5.0 volts.

Negative inputs, 304A and 304C of the comparators. 292A and 292C, are connected to the 3.0 volts of the wiper 300A and positive inputs, 306B and 306D, of the comparators, 292B and 292D, are connected to the 5.0 volts of the wiper 300B. The wiper 164A is connected to a positive input 306A and to a negative input 304B of the comparators, 292A and 292B. The wiper 164B is connected to a positive input 306C and to a negative input 304D. The comparator 292 is connected to both a positive voltage source and to ground, as shown.

In operation, if, for instance, the voltage at the wiper 164A drops below the 3.0 volts, then, since 3.0 volts is applied to the positive input 306A of the comparator 292A, an output 308A of the comparator 292A goes low, approaching ground potential. At this time, any voltage in a signal conductor 310 is lowered to a few tenths of a volt by the diode 296A.

In like manner, if either of the wipers, 164A or 164B, produces a voltage that exceeds 5.0 volts, then one of the comparators, 292B or 292D, goes low, then a voltage in the signal conductor 310 is lowered to a few tenths of a volt by the respective diode, 296B or 296D.

Therefore, it can be understood that the signal conductor 310 of the limit switch apparatus 204 of FIG. 31 can be connected anywhere in an electronic system in which a low will stop the conveyance 10 of FIG. 1.

The limit switch apparatus 204 of FIG. 31 further includes a soft-react resistor, or component, 312, a soft-react capacitor, or component, 314, a pull-up resistor 316, a P-Channel FET 318, a bias resistor 320, and a diode 322.

When a logic "low" occurs in the signal conductor 310, a gate terminal G of the FET 318 goes low, the FET 318 conducts, and the bias resistor 320 and the diode 322 cooperate to bias the conductor 248 high which is also the same-numbered conductor of the sawtooth generator 206 of FIG. 27.

As discussed in conjunction with FIGS. 25 and 27, biasing the conductor 248 of the sawtooth generator 206 results in raising the sawtooth wave 208 with respect to the reference voltage 250.

However, If the conveyance 10 of FIG. 1 were to stop abruptly when the limit switch apparatus 204 senses an overrange condition of a transducer such as the mercury-wiped transducer 62 of FIG. 14, this abrupt stop could be disconcerting, if not dangerous to the person 56 of FIG. 4 operating the conveyance 10.

In like manner, an abrupt start would be equally disconcerting. and perhaps more dangerous, if the person 56 of FIG. 14 inadvertently caused an overrange condition of the transducer 62, the conveyance 10 of FIG. 1 stopped, and then the person 56 corrected the overrange condition.

However, when a logic "low" occurs in the signal conductor 310, the resistor 312 and tile capacitor 314 cooperate to provide a "soft" shut-down, because of the time that is required to discharge the capacitor 314 through the resistor 312. Not only do these two components, 312 and 314, cooperate to provide a "soft" shut down, but also the resistors, 312 and 316, cooperate to function as a voltage divider further slowing reaction to the logic "low" in the signal conductor 310.

In like manner, when the signal conductor 310 no longer conducts to ground through one of the diodes 296A–296D, the resistor 316 and the capacitor 314 cooperate to provide a "soft" start because of the time required to charge the capacitor 314 through the resistor 316.

Referring again to FIG. 24, the signal limiting apparatus 226 includes diodes 324A and 324B, resistors 326A and 326B, and a potentiometer 328 with a resistor 330 and a wiper 332. The resistors, 326A, 326B, and 330, are connected in series between a source and ground as shown.

Selective setting of the wiper 332 selectively places a potential at a point 334 between the diodes, 324A and 324B. Whenever an amplified control signal, 282A or 232B of FIG. 25, in one of the conductors, 240A or 240B, attempts to exceed the potential selectively set at the point 334, the voltage of that control signal, 232A or 232B, is limited by action of one of the diodes, 324A or 324B, to only a few tenths higher than the voltage adjustably set at the point 334.

Therefore, the signal limiting apparatus 226 provides means for selectively limiting the speed of the motors, 14A and 14B, and the speed of the conveyance 10 of FIG. 1, irrespective of the magnitude of the amplified control signal, 232A or 232B.

Earlier, a use of the limit switch apparatus 204 of FIG. 31 was described in which a logic "high" of the limit switch apparatus 204 is used to raise the sawtooth wave 208 with respect to the reference voltage 250 of FIG. 25. Alternately, the logic "low" in the signal conductor 310 of the limit switch apparatus 204 may be used to stop the conveyance 10 of FIG. 1.

More particularly, the logic "low" of the limit-switch apparatus 204 of FIG. 31 in the conductor 310 may be attached to the point 334 between the diodes, 324A and 324B, to bleed down the amplified control signals, 232A and 232B of FIG. 25 developed by the amplifiers, 224A and 224B.

Or, alternately, the logic "low" in the signal conductor 310 of the limit switch apparatus 204 of FIG. 31 may be attached to a point 336 between the resistor 326A and the resistor 330 of the potentiometer 328.

Earlier it was mentioned that the tilt switch 92 of the eyeglass X-Y controller 90 of FIG. 6 could be used to stop the conveyance 10 of FIG. 1. Now it can be seen that, instead of using the limit switch apparatus 204 of FIG. 31, alternately the tilt switch 92 can be attached by the cable 94 to ground and to either the point 334 or the point 336 of the signal limiting apparatus 226 of FIG. 24 to provide automatic shutdown of the system 200 when an excessive tilt of the head 70 of FIG. 4 indicates the possibility of inability to control the conveyance 10.

However, it is preferable to use the logic "high" in the conductor 246 to raise the sawtooth wave 208 with respect to the reference voltage 250 of FIG. 25, as previously described.

The reason for this can be seen by referring to FIGS. 24 and 25. With the amplified control signal 232A of the amplifier 224A at the magnitude shown, and with the amplified control signal 232B of the amplifier 224B at a lower magnitude as shown, the pulse widths. 234A and 234B, are as shown.

However, when a logic "high" in the conductor 248 of FIG. 27 of the limit switch apparatus 204 applies a bias voltage to the negative input 245 of the sawtooth generator 206, the sawtooth wave 208 is raised with respect to the reference voltage 250, and the pulse widths, 234A and 234B of FIG. 25, reduce equally and progressively to zero.

Therefore, if the conveyance 10 of FIG. 1 is in a turn, as indicated by the differences in the pulse widths, 234A and 234B, and the limit switch apparatus 204 senses an excessively large signal from the X-Y controller such as the eyeglass X-Y controller 58 of FIGS. 4 and 5, the pulse widths, 234A and 234B, are reduced equally, and the conveyance 10 continues to turn until stopped as dictated by the person 56 operating the conveyance 10.

However, If the logic "low" is applied to either the point 334 or the point 336, the larger of the amplified control signals, 232A or 232B, reduces first, so that the amplified control signals, 232A and 232B, first become equal, the speeds of the motors, 14A and 14B, become equal, the conveyance 10 of FIG. 1 ceases to make a turn, and the conveyance 10 comes to a stop at a location other than the one dictated by manually-actuated input to an X-Y controller, such as the X-Y controllers, 26 or 58 of FIGS. 2 and 5.

Figure 32:
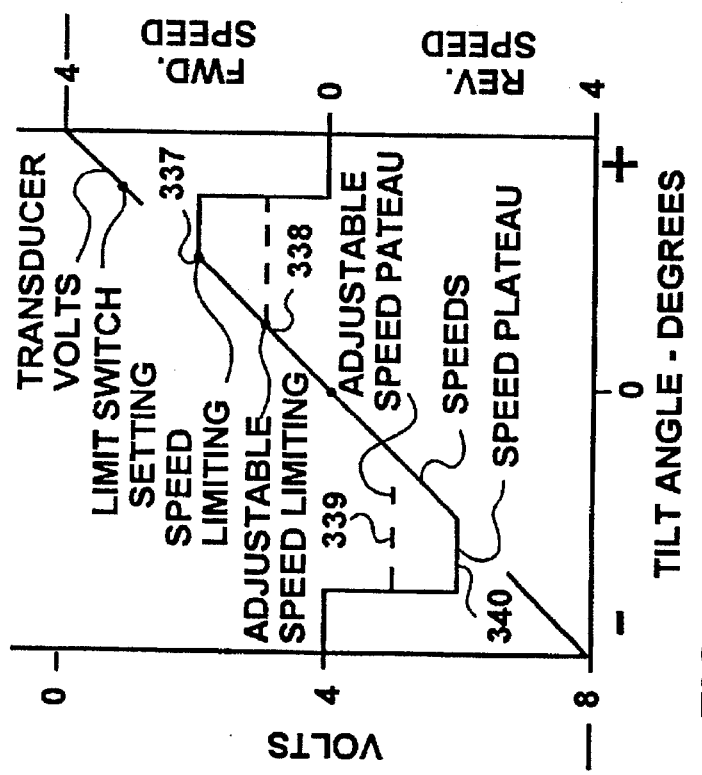
FIG. 32 is a graph of transducer volts and speed versus tilt angle of a tilt-angle transducer, showing tilt angles producing transducer volts that exceed the limit switch setting, showing speeds dropping to zero at a limit switch setting, showing both transducer volts and limit switch settings larger than a speed limit setting, and showing speed plateaus for two different speed limit settings.

Referring now to the graph of FIG. 32, tilt angles 142 of FIG. 14, both positive and negative are shown on the horizontal axis, volts are shown on the left vertical axis, and both forward and reverse speeds of a motor, 14A or 14B of FIG. 1, or both forward and reverse speeds of the conveyance 10, are shown on the vertical axis on the right.

The axis marked "volts" represents a voltage exiting the steering sensitivity control apparatus 156 of FIG. 16 in either the conductor 160A or the conductor 160B. More particularly, the "volts" of the graph in FIG. 32 represent volts produced by on of the transducers. 28A or 28B of FIG. 16 of the X-Y controller 26 of FIG. 2, although the voltage of FIG. 32 may have been increased or decreased in the steering sensitivity control apparatus 156 from the volts produced by the transducer, 28A or 28B.

When the apparatus 204 of FIG. 24 is controlled by an X-Y controller that uses tilt transducers, such as the mercury-wiped potentiometers 62 of the eyeglass X-Y controller 58 of FIGS. 4 and 5 tilt angles 142 of FIG. 14 of the bead 70 of FIGS. 4 and 5 may exceed tilt angles 142 that produce voltages used for controlling speeds and rotations of the motors, 14A and 14B.

That Is, as illustrated in FIG. 32, transducer volts range between zero and 8.0, even though these voltages greatly exceed voltages used for controlling the conveyance 10 of FIG. 1.

Of course, the minimum and maximum transducer volts may be selectively limited by using the transducer sensitivity control apparatus 202 of FIG. 28 to apply potentials to the potentiometer 62 of FIG. 14 that is other than 0 and 8.0 volts.

Referring now to FIGS. 24 and 32, and considering only forward speeds, voltage in one of the conductors, 160A or 160B, decreases from a zero-speed tilt angle 142 of FIG. 14 in which 4.0 volts is produced, the speed or one motor, 14A or 14B, progressively increases up to a speed limit setting that is selectively determined by setting the potentiometer 328 of the signal limiting apparatus 226.

Two speed limit settings are illustrated, one a higher speed limit 337 by a solid line, and a lower speed limit 338 by a dash line.

As shown by speed plateaus, 339 and 340 in FIG. 32, as tilt angles 142 of FIG. 14 of the transducer, such as the mercury-wiped transducer 62 increase further, speeds of the motor, 14A or 14B, remain constant. Also, as shown in the graph of FIG. 32, the speed plateau 339 of the dash line, representing a lower speed setting of the signal limiting apparatus 226, extends over a wider range of tilt angles 142 than the speed plateau 340 of the higher speed limit that Is shown by a solid line.

These speed plateaus, 339 and 340, allow the head 70 of FIGS. 4 and 5 to tilt beyond tilt angles 142 of FIG. 14 of the transducers 62 that produce limiting speeds without triggering shut-down of the system 200 by the limit switch apparatus 204.

When a tilt angle 142 of FIG. 14 is reached that produces a voltage equal to a setting of the limit switch apparatus 204, the motors, 14A and 14B, and the conveyance 10 of FIG. 1 stop.

But, by virtue of the soft-shut down provided by the resistor 312 and the capacitor 314 of FIG. 31, when a person 56 of FIG. 4 senses that the conveyance 10 of FIG. 1 is starting to shut down, he has time to correct his head position 70 to be within the range of tilt angles 142 of FIG. 4 that produce the speed plateau, 389 or 340, before the conveyance 10 comes to a stop.

As noted previously, shut down starts in accordance with volts in one of the conductors, 160A or 160B, of FIG. 24 reaching the setting of the limit switch apparatus 204.

If the tilt angle 142 of FIG. 14 increases still further, volts produced by the transducer, 28A, 28B, or 62, will continue to rise, raising the voltage in one of the conductors. 160A or 160B, but this increase in tilt angle 142 and volts has no effect on operation of the system 200.

Figure 33:
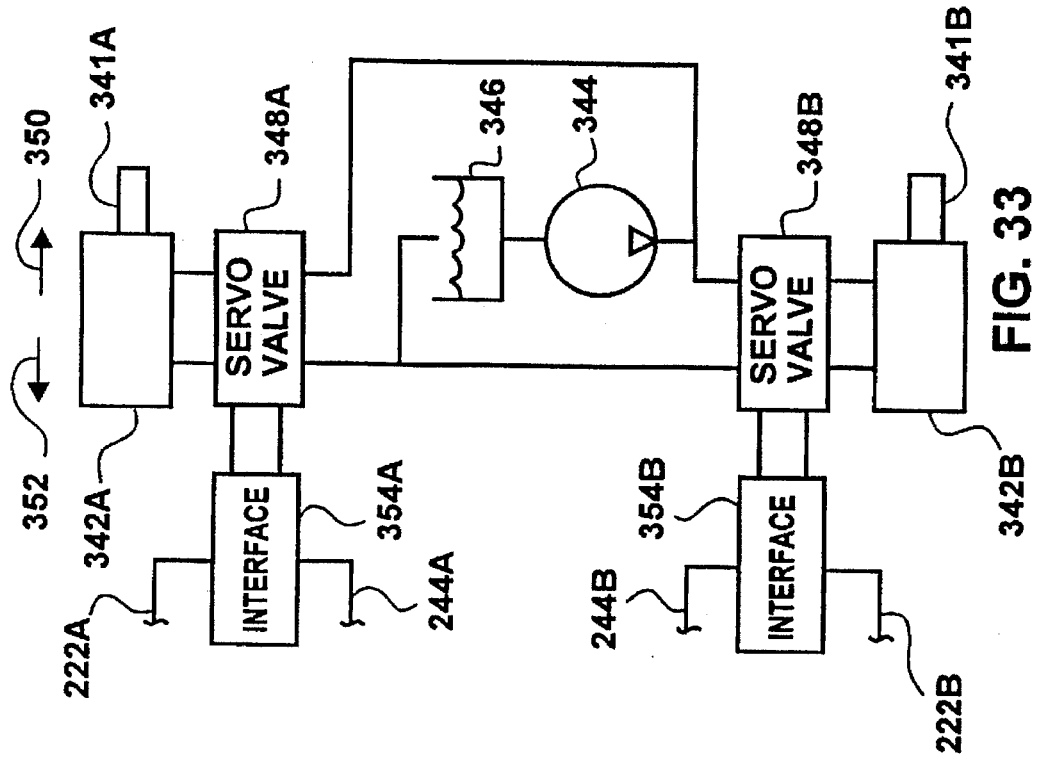
FIG. 33 is a schematic drawing of linear actuators replacing the D.C. electric motors of FIG. 24, and showing interfacing of the linear actuators with electrohydraulic servo valves.

Referring now to FIGS. 24 and 33, piston rods, 341A and 341B of linear actuators, or hydraulic cylinders, 342A and 342B, are powered by a pump 344 that receives fluid from a pump 346, and that delivers pressurized fluid to servo valves, 348A and 348B.

The linear actuators, 42A and 342B, are driven in a first direction 350 and in a second direction 352 at various speeds, and are selectively stopped by the servo valves, 348A and 348B.

The servo valves, 348A and 348B, are controlled by interfaces, 354A and 354B.

The interfaces, 354A and 354B, are connected to respective ones of the power amplifiers, 218A and 218B, by the conductors 222A and 222B to the pulse-width-modulated driving voltages, 220A and 220B in addition, the interfaces, 354A and 354B, are connected to respective ones of the logic/amplifiers, 224A and 224B, by the conductors, 244A and 244B.

The power amplifiers, 218A and 218B, deliver the pulse-width-modulated driving voltages, 220A and 220B, to the interfaces, 354A and 354B, and the polarity of the driving voltages, 220A and 220B, as applied to each of the servo valves, 348A and 348B, is determined by signals supplied from the logic/amplifiers, 224A and 224B, to the servo valves, 348A and 348B by the conductors, 244A and 244B.

It now becomes apparent that the interfaces, 354A and 354B, perform essentially the same function as the reversing relays, 223A and 223B. That is, they both receive two inputs.

One input is the pulse-width-modulated driving voltage, 220A or 220B, that determines speed of the actuators, 14A and 14B, or 342A and 342B.

The other input determines the direction of movement, whether the forward-rotation direction 242 or the reverse-rotation direction 243, of a rotary actuator, such as the motors, 14A and 14B, or first and second directions of reciprocating motions, such as the first 350 and second 352 directions of linear actuators such as the hydraulic cylinders, 342A and 342B.

Since interfacing of signals is well known in the art, a detailed description is unnecessary. However, one method of interfacing can be understood by considering the method of reversing polarities taught in U.S. Pat. No. 4,906,906.

The preceding description demonstrates that the present invention is applicable to any rotary or linear actuator that can be interfaced with the system 200 of FIG. 24.

The method of the present invention includes controlling speed a conveyance as a function of first and second inputs to first and second transducers, controlling steering as a function of differences in the inputs, automatically reducing differences between outputs of the transducers as an inverse and nonlinear function, automatically reducing steering sensitivity as an inverse and nonlinear function of the differences, and automatically reducing speed of the conveyance as a nonlinear function of the differences.

The method of the present invention also includes producing first and second control signals proportional to first and second inputs. producing differences in the control signals proportional to differences in the inputs, and decreasing differences between the electrical signals as an inverse and nonlinear function of the differences.

The method of the present invention further includes selecting high and low limits for the control signals, producing a shut-down signal whenever one of the control signals exceeds one of the limits, selectively limiting maximum control signals irrespective of the inputs and proportionalities, applying higher and lower potentials of the same polarity to first and second potentiometers, electrically changing proportionalities of the transducers by decreasing the higher potential and increasing the lower potential by equal amounts.

The apparatus of the present invention includes means for decreasing steering sensitivity of a conveyance as an inverse and nonlinear function of differences in X and Y inputs to transducers or first and second inputs to two transducers, and means for automatically decreasing speed of the conveyance as an inverse and nonlinear function of the differences.

The apparatus of the present invention includes changing means for reducing differences between first and second outputs as an inverse and nonlinear function of the differences, means for changing the nonlinearity, means for increasing one of the outputs, means for decreasing one of the outputs, means comprises means for changing both of the outputs, means for electrically changing proportionality of output vs. input of transducers without changing zero-speed inputs, means for electrically changing proportionality of output vs. tilt angles of transducers without changing the zero-speed tilt-angles, means for decreasing the higher potential and increasing the lower potentials applied to a transducer by equal amounts, means for shutting down first and second actuators whenever either of two analog outputs goes beyond an allowable output means for variably limiting control signals to magnitudes that variably limit speeds of the actuators up to allowable maximum speeds without limiting the outputs of the transducers.

It should be understood that various components of the present invention rosy be manufactured and used as subcomponents. For instance, a subcombination of the transducer sensitivity control apparatus 202 of FIG. 28, an X-Y controller, such as the X-Y controller 26 of FIG. 2, and the steering sensitivity control apparatus 156 of FIG. 16 provides sensitivity enhancement to an X-Y controller, such as the X-Y controller 26.

in summary, the transducer sensitivity control apparatus 202 of FIG. 28 provides means for selectively adjusting the proportionality of electrical output to mechanical input of transducers, such as the transducer 28A of FIG. 16. And, when used with tilt transducers, such as the mercury-wiped transducer 62 of FIGS. 13 and 14, the transducer sensitivity control apparatus 202 provides means for selectively adjusting proportionality of electrical output to the tilt angle 142.

The steering sensitivity control apparatus, 156 or 180 of FIGS. 16 or 17, provides means for reducing the difference between two electrical signals as an inverse and nonlinear function of differences between the signals. Thus, the steering sensitivity control apparatus, 156 or 180, provides automatic control of steering sensitivity and also automatically reduces the speed of the conveyance 10 of FIG. 1 when making sharp or pivot turns, thereby providing both ease of steering control and safety when making sharp turns.

The limit switch apparatus 204 of FIG. 31 provides adjustable means to shut down the system 200 of FIG. 24 whenever an input to a transducer, such as the potentiometer 62, such as an excessive tilting of the head 70 of the person 56 in FIGS. 4 and 5, indicates possible inability to control the conveyance 10 of FIG. 1.

The signal limiting apparatus 226 of FIG. 24 provides means for selectively limiting the speed of the conveyance 10 of FIG. 1 to any speed below and up to a maximum speed, even though outputs of the X-Y controller, such as the eyeglass X-Y controller 58 of FIGS. 4 and 5, far exceed outputs commensurate with the desired speeds.

Finally, X-Y controllers, such as the eyeglass X-Y controller 58 of FIGS. 4 and 5, provide means for control of the conveyance 10 of FIGURE by persons 56 who do not have the ability to use conventional X-Y controllers, such as the X-Y controller 26 of FIGS. 2 and 3. The use of the eyeglass X-Y controller 58 or 90 of FIGS. 4 or 6, and the various other body-component actuated X-Y controllers, 100, 110, or 148, is made practical by use in combination with the transducer sensitivity control apparatus 202 of FIG. 28, the steering sensitivity control apparatus 156 of FIG. 16, the limit switch apparatus 204 of FIG. 31, and the signal limiting apparatus 226 of FIG. 24.

Although the present invention has been described primarily as a system for use with a conveyance in which both speed and direction of D.C. motors, 14A and 14B, are controlled, it has also been shown that the present invention is applicable for use in controlling linear actuators, such as the hydraulic cylinders, 342A and B of FIG. 33. Therefore, reference to an actuator is to be understood as any linear or rotatory actuator that can be controlled by electrical signals.

While specific apparatus and method have been disclosed in the preceding description, and while part numbers have been inserted parenthetically into the claims to facilitate understanding of the claims, It should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

Industrial Applicability

The present invention is applicable for use in controlling linear and rotary actuators, whether the actuators be electrical, hydraulic, or pneumatic, and the present invention is applicable for use with any kind of apparatus, including power wheelchairs and robotic equipment, in which these kinds of actuators are used, and in which ease and accuracy of control is either advantages or imperative.

What is claimed is:

1. A method for controlling speeds of first and second actuators as a function of first and second outputs produced by respective ones of first and second transducers and a difference between said outputs, and for controlling a difference in speed between said actuators as a function of said difference between said outputs, which method comprises:

a) user actuating said first transducer to selective input positions;

b) user actuating said second transducer to selective input positions;

c) producing said first output from said first transducer that is proportional to said selective positions thereof;

d) producing said second output from said second transducer that is proportional to said selective positions thereof;

e) reducing said difference between said outputs as an inverse and nonlinear function of said difference between said outputs; and f) controlling said actuators as a function of said reduced difference.

2. A method as claimed in claim 1 in whict said input positions of said first transducer include a zero-speed position wherein said first actuator is stopped, and actuating positions wherein speeds of said first actuator are selectively controlled in first and second directions, and said method further comprises:

a) electrically changing said proportionality of said first output with respect to said actuating positions thereof; and b) maintaining said zero-speed position of said first transducer subsequent to said changing step.

3. A method as claimed in claim 2 in which:

a) said producing of said output from said first transducer comprises applying higher and lower potentials of the same polarity to said first output;

b) said changing of said proportionality of said first transducer comprises decreasing said higher potential and increasing said lower potential; and c) said maintaining of said zero-speed position of said first transducer comprises decreasing and increasing said potentials by equal amounts.

4. A method as claimed in claim 1 in which said body-component, actuation of said transducers comprises tilting said first and second transducers about first and second sensing axes, said positions of said transducers comprise tilt angles, said first transducer includes a zero-speed tilt angle wherein said first actuator is stopped, and said first transducer includes tilt angles wherein said speeds of said first actuator are selectively controlled in first and second directions, and said method further comprises:

a) electrically changing said proportionality of said output of said first transducer with respect to said tilt angles thereof; and b) maintaining said zero-speed tilt-angle of said first transducer subsequent to said changing step.

5. A method as claimed in claim 4 in which:

a) said producing of said outputs comprises applying higher and lower potentials of the same polarity to said first transducer;

b) said changing of said proportionality of said output of said first transducer comprises decreasing said higher potential and increasing said lower potential; and c) said maintaining of said zero-speed tilt-angle of said first transducer comprises decreasing and increasing said potentials by equal amounts.

6. A method as claimed in claim 1 in which said method further comprises:

a) determining maximum limits for said outputs;

b) allowing said body-component actuation of said transducers to input positions that produce outputs in excess of said maximum limits;

c) developing control signals from said outputs;

d) selectively limiting said control signals; and e) using said selectively-limited control signals to selectively limit speeds of said actuators up to maximum speeds.

7. A method as claimed in claim 1 in which said method further comprises:

a) determining maximum limits for said outputs;

b) allowing said user actuation of said transducers to input positions that produce outputs in excess of said maximum limits;

c) establishing over-range limits for said outputs that are in excess of said maximum limits; and d) stopping said actuators when one of said outputs is in excess of one of said over-range limits.

8. A method as claimed in claim 1 in which said positions of said transducers comprise tilt angles, and said method further comprises:

a) determining maximum limits for said outputs;

b) allowing said body-component actuation of said transducers to said tilt angles that produce outputs in excess of said maximum limits;

c) establishing over-range limits for said outputs that are in excess of said maximum limits; and d) stopping said actuators when one of said outputs is in excess of one of said over-range limits.

9. A method as claimed in claim 1 in which said controlling of said speeds of said actuators comprises controlling speeds of D.C. motors in both forward and reverse directions.

10. A method as claimed in claim 1 in which said actuators comprise first and second D.C. motors, said input positions of said first and second transducers include respective first and second zero-speed positions wherein said first and second motors are stopped, said input positions of said transducers include first and second forward actuating positions wherein speeds of said first and second motors are selectively controlled in a forward direction, said input positions of said transducers include first and second reverse actuating positions wherein speeds of said first and second motors are selectively controlled in a reverse direction, said producing of said outputs from said transducers comprises applying higher and lower potentials of the same polarity to both of said transducers, and said method further comprises:

a) changing said proportionality of said outputs to said selective positions by decreasing said higher potential and increasing said lower potential;

b) maintaining said zero-speed positions of said transducers by decreasing and increasing said potentials by equal amounts;

c) determining maximum limits for said outputs;

d) allowing said body-component actuation of said transducers to input positions that produce outputs in excess of said maximum limits;

e) developing control signals from said outputs;

f) selectively limiting said control signals;

g) using said selectively-limited control signals to selectively limit speeds of said motors up to maximum speeds;

h) establishing over-range limits for said outputs that are in excess of said maximum limits; and i) stopping both of said motors when one of said outputs is in excess of one of said over-range limits.

11. A method as claimed in claim 1 in which said actuators comprise first and second D.C. motors, said input positions of said first and second transducers comprise first and second tilt angles about respective ones of first and second axes, said first and second tilt angles include respective first and second zero-speed tilt positions wherein said first and second motors are stopped, said input positions of said transducers comprise first and second forward-speed tilt angles wherein speeds of said first and second motors are selectively controlled in a forward direction, said input positions of said transducers comprise first and second reverse-speed tilt angles wherein speeds of said first and second motors are selectively controlled in a reverse direction, said producing of said outputs from said transducers comprises applying higher and lower potentials of the same polarity to both of said transducers, and said method further comprises:

a) changing said proportionality of said output to said tilt angles by decreasing said higher potential and increasing said lower potential;

b) maintaining said zero-speed positions of said transducers by decreasing and increasing said potentials by equal amounts;

c) determining maximum limits for said outputs;

d) allowing said body-component actuation of said transducers to tilt angles that produce outputs in excess of said maximum limits;

e) developing control signals from said outputs;

f) selectively limiting said control signals;

g) using said selectively-limited control signals to selectively limit speeds of said motors;

h) establishing over-range limits for said outputs that are in excess of said maximum limits; and i) stopping both of said motors when one of said outputs is in excess of one of said over-range limits.

12. A method for controlling both speed and steering of a conveyance, which method comprises:

a) controlling said speed as a function of first and second input positions of first and second transducers;

b) controlling said steering as a function of a difference in said input positions; and c) decreasing sensitivity of said steering to said difference as an inverse and nonlinear function of said difference.

13. A method as claimed in claim 12 in which said controlling of said speed and steering of said conveyance comprises controlling both forward and reverse speeds of first and second motors, said controlling of said forward and reverse speeds of said motors comprises producing first and second outputs from respective ones of said first and second transducers proportional to said first and second input positions, said producing of said proportional outputs comprises applying higher and lower potentials of the same polarity to both of said transducers, and said method further comprises:

a) actuating said transducers from respective ones of first and second zero-speed input positions, wherein both of said motors are stopped, to achieve said forward and reverse speeds of said motors;

b) electrically changing said proportionality of said outputs of said transducers with respect to input positions thereof by increasing said lower potential and decreasing said higher potential;

c) maintaining said zero-speed input positions of both of said transducers subsequent to said changing step by making said increasing and decreasing steps equal;

d) determining maximum motor-speed limits for said outputs;

e) allowing said transducers to produce outputs that exceed said maximum motor-speed limits;

f) developing control signals from said outputs;

g) selectively limiting said control signals;

h) using said selectively limited control signals to limit speeds of said motors up to maximum speeds;

i) establishing minimum and maximum over-range limits for both of said outputs; and j) stopping said conveyance when one of said outputs is outside of one of said over-range limits.

14. A method for controlling both speed and steering of a conveyance, which method comprises:

a) controlling said speed as a function of first and second inputs to first and second transducers;

b) controlling said steering as a function of a difference in said inputs; and c) automatically reducing said speed of said conveyance as a nonlinear function of said difference.

15. A method for producing control signals, which method comprises:

a) producing first and second control signals proportional to successive ones of first and second inputs;

b) decreasing differences in said control signals as an inverse and nonlinear function of said differences whenever said first control signal is greater than said second control signal; and c) decreasing differences in said control signals as an inverse and nonlinear function of said differences whenever said second control signal is greater than said first control signal.

16. A method as claimed in claim 15 in which said method further comprises electrically changing one of said proportionalities.

17. A method as claimed in claim 15 in which said method further comprises:

a) selecting high and low limits for both of said control signals; and b) producing a shut-down signal whenever one of said control signals exceeds one of said limits.

18. A method as claimed in claim 15 in which said method further comprises selectively limiting maximums of said control signals irrespective of both said inputs and said proportionalities.

19. A method as claimed in claim 15 in which said producing of said control signals comprises applying higher and lower potentials of the same polarity to first and second potentiometers, and said method further comprises:

a) electrically changing said proportionalities by increasing said lower potential and decreasing said higher potential by equal amounts;

b) selecting high and low limits for both of said control signals;

c) producing a shut-down signal whenever one of said control signals exceeds one of said limits; and d) selectively limiting maximums of said control signals irrespective of both said inputs and said proportionalities.

20. A method for producing control signals, which method comprises:

a) producing successive ones of first and second control signals proportional to successive inputs with respect to a first axis;

b) decreasing differences between said control signals as an inverse and nonlinear function of said differences whenever one of said control signals is larger than the other of said control signals; and c) said decreasing step comprises analog processing of one of said control signals.

21. A method as claimed in claim 20 in which said producing of said control signals comprises:

a) applying higher and lower potentials to respective ones of first and second transducers;

b) selectively increasing said lower potential and decreasing said higher potential; and c) making said increasing and decreasing steps equal.

22. An X-Y controller (58) which comprises:

eyeglass frames (60) having a pair of earpieces (64A and 64B);

means, comprising first and second transducers (62), each having a sensing axis (68A and 68B), and both being mounted to said eyeglass frames, for producing first and second outputs that are proportional to inclinations of a head (70) of a person (56) wearing said eyeglass frames; and said sensing axes being disposed at equal and opposite angles to said earpieces, and being disposed at a larger angle to each other.

23. An X-Y controller (98) as claimed in claim 22 in which said transducers comprise mercury-wiped potentiometers (62).

24. A method for controlling speeds of first and second actuators as a function of first and second outputs produced by respective ones of first and second transducers, and for controlling differences in speeds of said actuators as a function of differences in said outputs, which method comprises:

a) user actuating said first transducer to selective input positions;

b) user actuating said second transducer to selective input positions;

c) producing said first output from said first transducer that is proportional to said selective positions thereof;

d) producing said second output from said second transducer that is proportional to said selective positions thereof;

e) decreasing said first output as an inverse and nonlinear function of said second output whenever said first output exceeds said second output; and f) decreasing said second outpost as an inverse and nonlinear function of said first output whenever said second output exceeds said first output.

25. A method for controlling speeds of first and second actuators in response to first and second outputs produced by respective ones of first and second transducers, and for controlling differences in speeds of said actuators in response to differences in said outputs, which method comprises:

a) user actuating said first transducer to selective input positions;

b) user actuating said second transducer to selective input positions;

c) producing said first output from said first transducer that is proportional to said selective positions thereof;

d) producing said second output from said second transducer that is proportional to said selective positions thereof;

e) increasing said first output as an inverse and nonlinear function of said differences whenever said first output is lower than said second output; and f) increasing said second output as an inverse and nonlinear function of said differences whenever said second output is lower than said first output.

26. A method as claimed in claim 1 in which said reducing step comprises analog processing of one of said outputs as a function of the other of said outputs.

27. A method as claimed in claim 14 in which:

a) said controlling steps comprise producing first and second outputs from respective ones of said transducers that are proportional to said inputs; and b) said reducing step comprises analog processing of one of said outputs as a function of the other of said outputs.

28. A method as claimed in claim 1 in which:

a) said actuating steps comprise operatively attaching said first and second transducers to a head of a user; and b) said producing steps comprise mercury wiping a resistor in one of said transducers.

29. A method as claimed in claim 28 in which said operatively attaching step comprises:

a) attaching said transducers to an eyeglass frame; and b) attaching said eyeglass frame to said head of said user.

\* \* \* \* \*

UNITED STATES PATENT AND TRADEMARK OFFICE
CERTIFICATE OF CORRECTION

PATENT NO. : 5,635,807  
DATED : June 3, 1997  
INVENTOR(S) : John L. Lautzenhiser Page 1 of 2

It is certified that error appears in the above-indentified patent and that said Letters Patent is hereby corrected as shown below:

On the cover page, the line labeled "[54]," "ELECTRONIC CONTROLS FOR LINEAR AND ROTARY ACTUATORS" should be --STEERING SENSITIVITY CONTROL FOR WHEEL-CHAIRS--. In column 1, "ELECTRONIC CONTROLS FOR LINEAR AND ROTARY ACTUATORS" should be --STEERING SENSITIVITY CONTROL FOR WHEELCHAIRS-- in lines 1 and 2. In column 2, --a--should be inserted after "achieves" in line 54; and "signs, is," should be --signals-- in line 56. In column 3, "selectively" should be --selective-- in line 61. In column 5, "eyeglasses. The" should be --eyeglasses, the-- in line 31. In column 6, "Lautzenhtser" should be --Lautzenhiser-- in line 51; and "Lautzenhtser" should be --Lautzenhiser-- in line 60. In column 8, "148" should be --14B-- in line 13. In column 9, "84" should be --34-- in line 3; "84" should be --34-- in line 5; "84" should be --34-- in line 8; and "84" should be --34-- in line 17. In column 11, "152B" should be --152B-- in line 41; "rising" should be --using-- in line 48; "16" should be --15-- in line 50; "I60B" should be --160B-- in line 60; and "68" should be --58-- in line 66. In column 12, "16413" should be --164B-- in line 19; and "1668" should be --166B--in line 60. In column 13, "3" should be --34-- in line 29; "128" should be --12B-- in line 46; and "2" should be --3-- in line 57. In column 14, "bas" should be --has-- in line 56. In column 16, "lead" should be --load-- in line 21; and "lead" should be --load-- in line 23. In column 17, "approved" should be --improved-- in line 15. In column 19, "36A" should be --236A-- in line 12; and "36A" should be --236A-- in line 18. In column 20, "sad" should be --and-- in line 52. In column 22, "66" should be --56-- in line 39. In column 23, "282A" should be --232A-- in line 53. In column 25, "bead" should be --head-- in line 12; "or" should be --of-- in line 27; and "389" should be --339-- in line 58. In column 26, "42A" should be --342A-- in line 6. In column 27, "rosy" should be --may-- in line 31. In column 28, --1-- should be inserted after "FIGURE" in line 3. In Claim 2, "whict" should be --which-- in line 64. In Claim 3, "output" should be --transducer-- in line 11;

UNITED STATES PATENT AND TRADEMARK OFFICE
CERTIFICATE OF CORRECTION

PATENT NO. : 5,635,807
DATED : June 3, 1997
INVENTOR(S) : John L. Lautzenhiser

It is certified that error appears in the above-indentified patent and that said Letters Patent is hereby corrected as shown below:

and "transducer" should be --output-- in line 13. In Claim 4, the comma after "component" should be deleted in line 20. In Claim 23, "(98)" should be --(58)-- in line 8. In Claim 24, "outpost" should be --output-- in line 30.

Signed and Sealed this

Second Day of December, 1997

BRUCE LEHMAN

Attest:

Attesting Officer

Commissioner of Patents and Trademarks